United States Patent
Shimada

(10) Patent No.: US 7,488,053 B2
(45) Date of Patent: Feb. 10, 2009

(54) PRINTING SYSTEM, PRINTING METHOD, AND MEDIUM STORING CONTROL PROGRAM FOR THE PRINTING SYSTEM

(75) Inventor: Kazumichi Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 856 days.

(21) Appl. No.: 10/973,287

(22) Filed: Oct. 27, 2004

(65) Prior Publication Data

US 2005/0219618 A1    Oct. 6, 2005

Related U.S. Application Data

(63) Continuation of application No. 10/209,663, filed on Aug. 1, 2002, now Pat. No. 6,880,915.

(30) Foreign Application Priority Data

Aug. 3, 2001   (JP) ............................. 2001-236322

(51) Int. Cl.
    *B41J 2/21* (2006.01)
(52) U.S. Cl. ......................... 347/43; 347/100
(58) Field of Classification Search .................. 347/43, 347/100
    See application file for complete search history.

(56) References Cited

U.S. PATENT DOCUMENTS

| | | | |
|---|---|---|---|
| 4,672,432 A | 6/1987 | Sakurada et al. | |
| 4,855,753 A | 8/1989 | Ichikawa et al. | |
| 4,860,026 A | 8/1989 | Matsumoto et al. | |
| 4,952,942 A | 8/1990 | Kanome et al. | |
| 4,959,659 A | 9/1990 | Sasaki et al. | |
| 5,221,954 A | 6/1993 | Harris | |
| 5,742,306 A * | 4/1998 | Gompertz et al. | ............. 347/43 |
| 6,290,762 B1 | 9/2001 | Elwakil | |

FOREIGN PATENT DOCUMENTS

| | | |
|---|---|---|
| EP | 0 401 023 A2 | 12/1990 |
| EP | 0 660 589 A2 | 6/1995 |

* cited by examiner

*Primary Examiner*—Thinh H Nguyen
(74) *Attorney, Agent, or Firm*—Sughrue Mion, PLLC

(57) ABSTRACT

Heretofore there has been a case where a monochromatic image having a sufficient power of expression cannot be printed because of a narrow selection range of saturation. According to the present invention, in a predetermined print head, there is adopted a construction wherein the gradation characteristic of a color region capable of being color-reproduced is enhanced while narrowing the color region with use of a cyan color ink of a low saturation, a magenta color ink of a low saturation, a yellow color ink of a high saturation, and a black color ink, and color reproduction is performed. The color tone of the printed monochromatic image can be adjusted minutely with respect to the color components of cyan and magenta. On the other hand, the color region capable of being color-reproduced is wide substantially in the direction of yellow. Therefore, it is possible to ensure a sufficient selection range of saturation and print a monochromatic image of a high image quality having a sufficient power of expression.

1 Claim, 15 Drawing Sheets

With high-density CM:

With low-density cm:

PRINTING SYSTEM, PRINTING METHOD, AND MEDIUM STORING CONTROL PROGRAM FOR THE PRINTING SYSTEM

CROSS-REFERENCE TO RELATED APPLICATIONS

This is a Continuation Application of U.S. application Ser. No. 10/209,663 filed Aug. 1, 2002 now U.S. Pat. No. 6,880,915; the disclosure of which is incorporated herein by reference.

BACKGROUND OF THE INVENTION

1. Field of the Invention

The present invention relates to a printing system, a printing method, a control program for the printing system, and a medium which stores the control program for the printing system.

2. Description of the Prior Art

According to the prior art, when a monochromatic image of a high quality having what is called sepia color or warm color is printed using a printer, color reproduction is performed using such chromatic color inks as a cyan color ink, a magenta color ink, and a yellow color ink, in addition to a black color ink. By the way, a black color ink usually contains carbon black, and the darkness of a black color ink depends on the quantity of the carbon black contained. Hereinafter a plurality of black color ink with different darkness are used, and the term of a black color ink is sometimes used as a general term for several black color inks with different darkness. In this case, for adjusting the color tone using chromatic color inks minutely, there are separately provided a cyan color ink, a magenta color ink and a yellow color ink, which are low in saturation, and printing of a monochromatic image is conducted using those inks.

But the aforesaid prior art has involved the following problems.

Due to a narrow selection range of saturation there sometimes has been a case where a monochromatic image having a sufficient power of expression cannot be printed. Further, in the case of a printer that can print in colors, it is necessary to separately provide special color inks.

SUMMARY OF THE INVENTION

The present invention has been accomplished in view of the above-mentioned problems and it is an object of the invention to provide a printing system and printing method capable of ensuring a sufficient selection range of saturation and printing a monochromatic image of a high image quality having a sufficient power of expression, as well as a control program for the printing system and a medium which stores the control program for the printing system.

For achieving the above-mentioned object, the present invention adopts a construction wherein, in a predetermined print head, the gradation characteristic of a color region capable of being color-reproduced is enhanced while narrowing the color region with use of a cyan color ink of a low saturation, a magenta color ink of a low saturation, a yellow color ink of a high saturation, and a black color ink, and color reproduction is performed.

In one aspect of the present invention which adopts the above construction, the color-reproducible color region is narrowed substantially in the directions of cyan and magenta by the cyan and magenta color inks low in saturation. As a result, the color tone of the monochromatic image printed can be adjusted minutely because the gradation characteristic is enhanced as to cyan and magenta color components. With the yellow color ink of a high saturation, the color-reproducible color region is wide substantially in the direction of yellow. When looking at the monochromatic image, the human eyes sense the yellow component as a relatively small component in comparison with cyan and magenta components, so even if there is used a yellow color ink of a high saturation, it is possible to develop a color tone of a fine texture in appearance. That is, while developing a color tone of a fine texture in appearance, it is possible to ensure a sufficient selection range of saturation of the printed monochromatic image and obtain a sufficient power of expression.

Thus, according to the present invention, it is possible to provide a printing system and printing method capable of ensuring a sufficient selection range of saturation and printing a monochromatic image of a high image quality having a sufficient power of expression, as well as a control program for the printing system and a medium which stores the control program for the printing system.

In another aspect of the present invention, as an example of the above various color inks, the foregoing yellow color ink of a high saturation may be constituted by an ink of a high saturation and a high density, the foregoing cyan color ink of a low saturation may be constituted by an ink low in both saturation and density, and the foregoing magenta color ink may be constituted by an ink low in both saturation and density. That is, the color-reproducible color region is narrowed substantially in the directions of cyan and magenta by the cyan and magenta inks low in both saturation and density. Substantially in the direction of yellow the same color region is widened by the yellow color ink high in both saturation and density. Consequently, with these color inks, it is possible to ensure a sufficient selection range of saturation of a monochromatic image printed and obtain a sufficient power of expression while developing a color tone of a fine texture in appearance.

Moreover, this can provide examples of various color inks.

In the case of a printing system that can make printing in colors using six colors of inks, it is not necessary to provide special color inks separately because there are included cyan and magenta color inks low in both saturation and density.

By making both cyan and magenta color inks low in density, the brightness of the cyan color ink and that of the magenta color ink become close to that of yellow color ink, so that the gap in brightness caused by a difference in hue becomes small and it is possible to print a monochromatic image of a high image quality.

As examples of the Black color ink are included not only black color ink with hue not imparted thereto but also black color ink with hue imparted thereto. As examples of the cyan color ink are included mixtures of a cyan color ink as a main component with other kinds of color inks. This is also true of magenta and yellow color inks.

The printing system according to the present invention may be composed of a printer and a computer connected to the printer, or may be constituted by a printer alone. Various system configurations can be adopted.

In a further aspect of the present invention, as an example of a printing system that can effect both monochromatic image printing and color printing, there may be adopted a construction wherein, in color printing, color reproduction is performed using a cyan color ink high in both saturation and density and a magenta color ink high in both saturation and density together with the aforesaid various color inks, while in monochromatic image printing, such cyan and magenta color inks high in both saturation and density are not used. In case of incorporating a small amount of cyan and magenta into a monochromatic image, there sometimes occurs what is called a color twist phenomenon such that with a color ink high in both saturation and density there is developed an unintended hue because of a low dot density. However, according to the construction in question, such a color twist phenomenon does not occur because cyan and magenta color inks high in both saturation and density are not used in monochromatic image printing.

According to this construction, moreover, there does not appear any unintended hue and it is possible to print a monochromatic image of a high image quality.

For changing inks to be used in accordance with the type of printing, color conversion tables for conversion from printing data to data for driving a print head may be provided correspondingly to printing types and may be switched from one to another according to the type of printing.

In a still further aspect of the present invention, an example of construction of the Black color ink comprises plural Black color inks different in density, and printing may be conducted using any or a combination of such Black color inks. That is, not only an appropriate Black color ink can be selected according to the brightness of image but also it is possible to diminish the gap in brightness at the time of replacing various chromatic color inks with Black color inks.

This allows the image quality of a monochromatic image printed to be improved because not only an appropriate Black color ink can be selected according to the brightness of image but also it is possible to diminish the gap in brightness at the time of replacing various chromatic color inks with Black color inks.

In a still further aspect of the present invention, as an example of construction using plural Black color inks different in density, the above Black color inks are a black color ink and a light black color ink lower in density than the black color ink. The light blank color ink may be provided so that it can be replaced with one or both of cyan and magenta color inks high in both saturation and density. That is, even if the number of ink cartridges which can be loaded to the printing system is limited, both printing of a monochromatic image of a high quality and color printing can be done in one and same printing system. For example, in the case of a printing system loaded with six kinds of color inks and able to make coloring printing, all that is required is to provide two kinds of light black color inks different in density and load then into ink cartridges in place of cyan and magenta color inks low in both saturation and density used in color printing. It goes without saying that these light black color inks, as well as cyan and magenta color inks low in saturation and density, may be loaded into ink cartridges and both printing of a monochromatic image of a high image quality and color printing may be done in one and same printing system.

This can, even if the number of ink cartridges is limited, effect both printing of a monochromatic image of a high image quality and color printing in one and same printing system.

There sometimes occurs a case where various color inks are to be used while taking into account the running cost of a printing system used. In view of this point, according to a further aspect of the present invention, there is provided a ratio setting acquiring means for acquiring the setting of a ratio between such plural Black color inks as referred to above and other color inks and printing is performed in accordance with the setting of the ratio acquired. If there are used many chromatic color inks, the running cost is apt to increase although the image quality will be improved. With the ratio setting acquiring means, it is possible to set the ratio between plural Black color inks and other color inks, with the result that it becomes possible to select according to preference whether the printing to be performed is a printing with importance attached to image quality or is a printing with importance attached to running cost.

In this way it is possible to set an appropriate ratio between plural Black color inks and other color inks and improve the convenience.

In a still further aspect of the present invention, as an example of a suitable construction for performing both monochromatic image printing and color printing in one and same printing system, there may be adopted a construction wherein there is provided a print type acquiring means for acquiring a print type out of a monochromatic image printing type and a color printing type, and printing is performed in accordance with the print type acquired. Thus, with the print type acquiring means, it is possible to set whether the printing to be performed is monochromatic image printing or color printing, whereby the convenience is improved. It is optional whether the print type acquiring means should use an operation input or an application program to acquire a print type.

In this way it is possible to set whether the printing to be performed is monochromatic image printing or color printing and hence possible to improve the convenience.

In the present invention, while narrowing a color-reproducible color region by using a yellow color ink of a high saturation, the gradation characteristic in the said color region is enhanced and printing of a monochromatic image of a high image quality is performed. In this connection, according to a further aspect of the present invention there is provided a printing system wherein, in printing a monochromatic image, there are used an achromatic color ink and a chromatic color ink of a low saturation which narrows a printable color region to a lower saturation side than in color printing, thereby effecting color reproduction in a narrower color region than in color printing. In this printing system, a yellow color ink high in saturation is used together with the above achromatic color ink and chromatic color ink of a low saturation, and printing of a monochromatic image is performed without narrowing the above color region from the time of color printing substantially in the direction of yellow.

That is, by using an achromatic color ink, a chromatic color ink of a low saturation, and a yellow color ink of a high saturation, the color region is not narrowed from the time of color printing substantially in the direction of yellow, but is narrowed from the time of color printing substantially in the other directions than the direction of yellow. In other words, by using a yellow color ink of a high saturation, the color-reproducible color region becomes wide substantially in the direction of yellow. As noted earlier, the human eyes sense yellow component relatively lower than cyan and magenta components, so even if there is used a yellow color ink of a high saturation at the time of printing a monochromatic image, it is possible to develop a color tone of a fine texture in appearance. Consequently, it becomes possible to ensure a sufficient selection range of saturation of the monochromatic image printed and obtain a sufficient power of expression. Besides, with use of a chromatic color ink of a low saturation, the brightness of the chromatic color ink approaches the brightness of the yellow color ink of a high saturation, so that the gap in brightness caused by the difference in hue becomes smaller.

The achromatic color ink may be a black or gray color ink or may be even a black color ink with hue imparted thereto. The chromatic color ink of a low saturation may be a light cyan color ink, a light magenta color ink, or a color ink intermediate between light cyan and light magenta.

As noted above, the object of application of the technique which enhances the gradation characteristic in a color-reproducible region while narrowing the same region and which performs color reproduction in this state is not always limited to a substantial system, but it is a matter of course that a predetermined processing procedure for the color reproduction underlies the invention. Thus, the present invention is also applicable as a method and it goes without saying that the above system configuration can be made corresponding to the method.

In carrying out the present invention there sometimes occurs a case where a predetermined program is allowed to be executed by a computer in a printing system wherein color reproduction is made with a predetermined print head using plural kinds of color inks. It goes without saying that the above system configuration can be made corresponding to the said control program.

Further, in carrying out the present invention there sometimes is a case where a medium which stores the above control program is in distribution and the control program is allowed to be executed by a computer. It goes without saying that the foregoing system configuration can be made corresponding to the above medium storing the control program.

A recording medium capable of being read by a computer may be a magnetic recording medium or a magneto-optic recording medium. This is completely true of any of recording mediums to be developed in future. The idea of the present invention is also applicable completely equally to the case where a part is software and a part is implemented by hardware. Further included is a mode in which a part is recorded on a recording medium and is read as necessary. There is no room for doubt that this is also true of such duplicating stages as primary and secondary duplicates.

Other and further objects, features and advantages of the invention will appear more fully from the following description.

DESCRIPTION OF THE PREFERRED EMBODIMENTS

Figure 1:
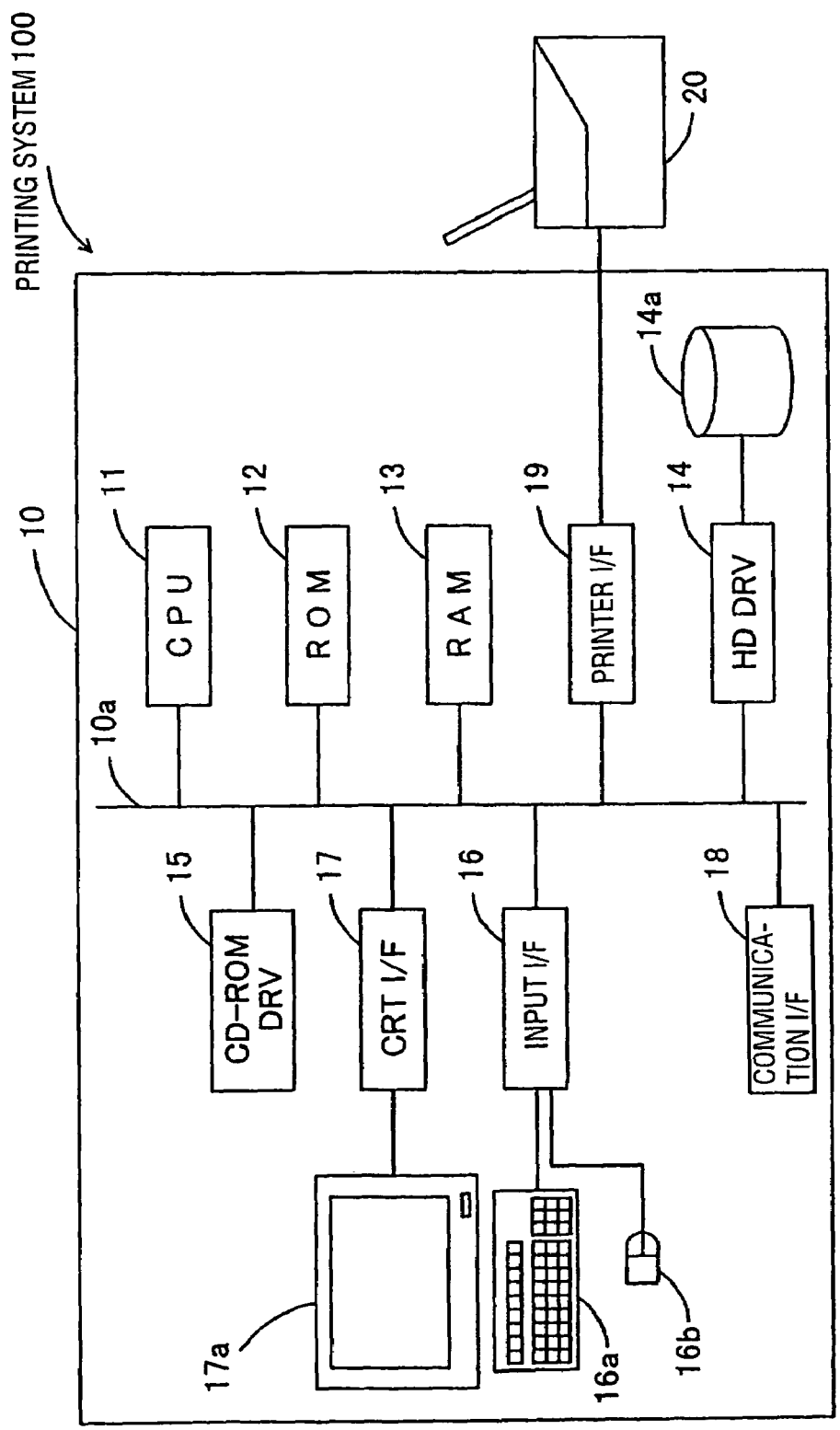
FIG. 1 is a block diagram showing a schematic construction of a printing system according to an embodiment of the present invention.

Embodiments of the present invention will be described hereinunder in accordance with the following procedure:

(1) Construction of a printing system
(2) Changes of data in conversion from printing data to printing jobs
(3) Color-reproducible color region in monochromatic image printing
(4) Operation of the printing system
(5) Modifications (1) Construction of a Printing System FIG. 1 illustrates a schematic construction of a printing system 100 according to an embodiment of the present invention. A block configuration of a person computer (PC) 10 is also shown in the same figure.

The printing system 100 of this embodiment comprises a personal computer 10 and a printer 20 which can make color printing. Therefore, the printing system 100 can perform not only printing of a monochromatic image but also color printing. The monochromatic image means an image having a substantially unitary hue. It is not limited to an image printed using a single color ink, but it can be printed using plural kinds of color inks at approximate equal proportions.

The personal computer 10 is provided with a CPU 11 which serves as the nucleus in arithmetic processing. The CPU 11 controls the whole of the personal computer 10 through a system bus 10a. ROM 12, RAM 13, hard disc drive 14, CD-ROM drive 15, input interface (input I/F) 16, CRT interface (CRT I/F) 17, communication interface (communication I/F) 18, and printer interface (printer I/F) 19 are connected to the system bus 10a.

The personal computer 10 used in this embodiment is what is called a desk top type personal computer and is described in a simplified state of its configuration. Of course, a computer having a general computer configuration is employable as the personal computer 10. For example, a notebook type or a mobile computer will do. The computer applicable to the printing system of the present invention is not limited to the personal computer.

In a hard disc 14a connected to the hard disc drive 14 there are stored an operating system (OS) as software and application programs (APL) which can generate document information and image information. These softwares, when to be executed, are transferred as necessary to the RAM 13 by CPU 11. Then, the CPU 11 executes various programs while making access as necessary to the RAM 13 as a temporary work area.

To the input I/F 16 are connected a keyboard 16a and a mouse 16b as operating input devices and also connected are a scanner and a digital camera (neither shown). Therefore, it is possible to read an image from the scanner or the digital camera and effect printing of a monochromatic image.

A display 17a is connected to the CRT I/F 17. Further, the printer 20 is connected to the printer I/F 19 through a parallel interface cable. Of course, it is not always necessary that the interface for connection with the printer 20 be limited to the parallel interface. Various connection modes may be adopted, including serial interface, SCSI, and USB connections. Any other connection modes to be developed in future are also employable.

Although the above softwares are stored in the hardware 14a, the recording medium which can store the softwares is not limited to the hard disc. For example, it may be a CD-ROM or a flexible disc. The softwares stored in any of these recording mediums are read through the CD-ROM drive 15 or a flexible disc drive (not shown) and are installed in the hard disc 14a, then are read onto the RAM 13 by CPU 11, which in turn executes various processings. As to the recording medium, no limitation is made to those referred to above, but there may be used a magneto-optic disc or a non-volatile memory as a semiconductor device. Further, the communication I/F 18 such as a modem connected to the system bus 10a may be connected to the Internet and access may be made to a server capable of storing various programs, allowing softwares to be down-loaded.

The printer 20 used in this embodiment is an ink jet printer and employs a total of six color inks in color printing, which are a cyan color ink (C) high in both saturation and density, a magenta color ink (M) high in both saturation and density, a yellow color ink (Y) high in both saturation and density, a cyan color ink (c) low in both saturation and density and called light cyan, a magenta color ink (m) low in both saturation and density and called light magenta, and a black color ink (k) which is one of a black color ink in general meaning. On the other hand, in monochromatic image printing, two kinds of light black color inks (k1, k2), which are also one of a black color ink in general meaning, and they are low in density, are used instead of high-density cyan and magenta.

In the following description and also in the drawings the colors of inks will be described merely as C, M, Y, c, m, K, k1, and k2. The color inks C, M, Y, c, and m are chromatic color inks, while the color inks K, k1, and k2 are achromatic inks. k1 is higher in brightness than K, and k2 is still higher in brightness than k1.

In printing a monochromatic image, if dots of a magenta color ink or a yellow color ink are mixed in dots of a black color ink, it is possible to color-reproduce a monochromatic image of what is called sepia or warm color. Likewise, if dots of a cyan or magenta color ink are mixed in dots of a black color ink, it is possible to color-reproduce a monochromatic image of what is called cool color. In this embodiment, dots of the color inks c, m, and Y are mixed in dots of the color inks K, k1, and k2. As a result, it becomes possible to create a unique atmosphere such as an atmosphere suggestive of an old photograph.

Figure 2:
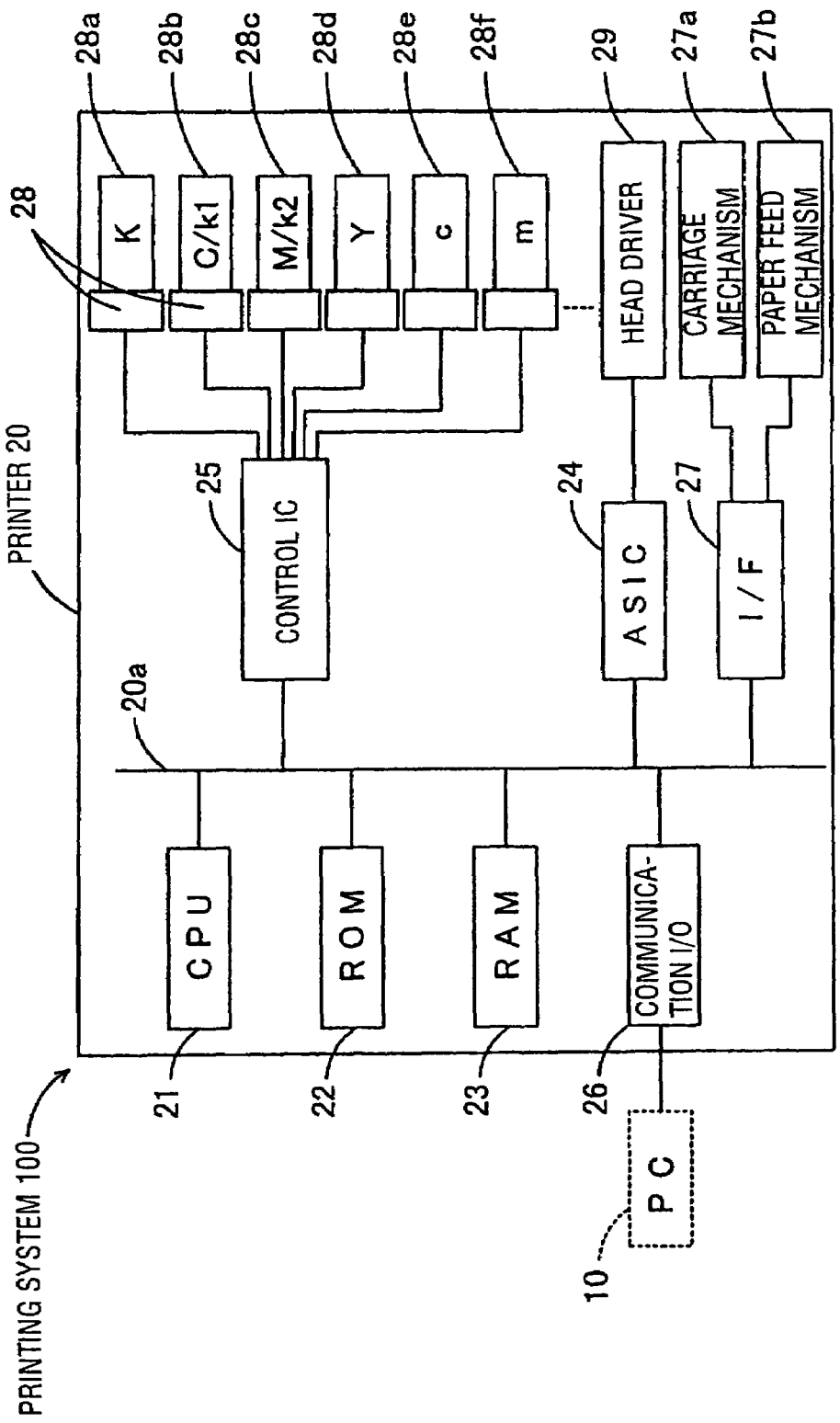
FIG. 2 is a block diagram showing a block configuration of a printer together with a personal computer.

FIG. 2 shows a block construction of the printer 20 together with the personal computer 10. A bus 20a is provided in the interior of the printer 20, and CPU 21, ROM 22, RAM 23, ASIC 24, control IC 25, communication I/O 26, and interface (I/F) 27 for the transmission of image data and drive signals, are connected to the bus 20a. The CPU 21 controls various portions in accordance with programs stored in the ROM 22 while utilizing RAM 23 as a work area.

ASIC 24 is an IC customized for driving a print head (not shown) and it performs processings for driving the print head while transmitting and receiving predetermined signals to and from the CPU 21. Further, the ASIC 24 outputs applied voltage data for a head driver 29.

The head driver 29 is a circuit which comprises a dedicated IC, a driving transistor, and a heat sink. In accordance with the applied voltage data inputted from ASIC 24 the head driver 29 generates an applied voltage pattern for piezoelectric elements incorporated in the print head. The print head is connected cartridge holders 28 through tubes provided color ink by color ink, the cartridge holders 28 being loaded with six ink cartridges 28a to 28f respectively and supplied with color inks. Piezoelectric elements are actuated within ink chambers communicating between the tubes and orifices, whereby inks are ejected.

Figure 3:
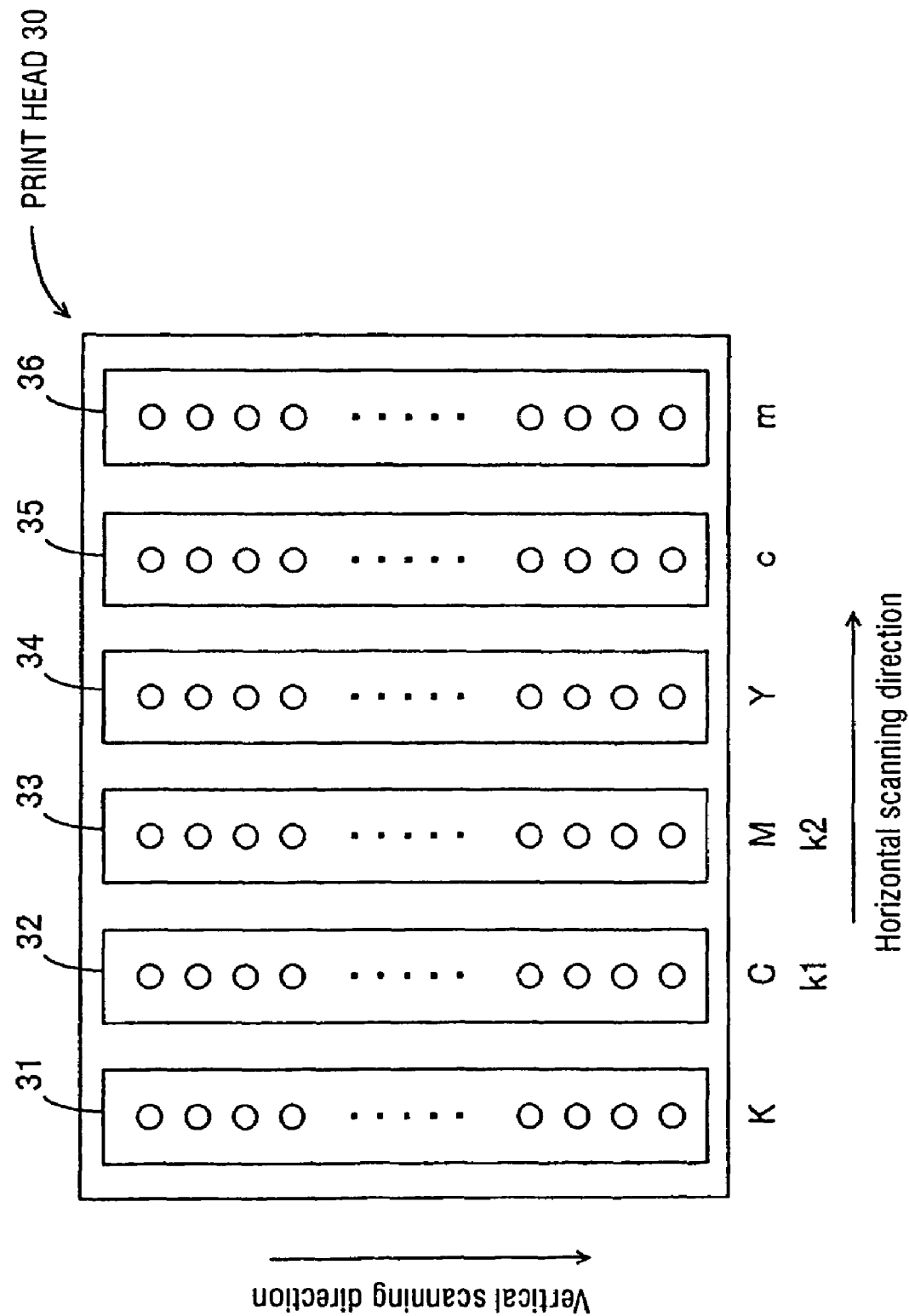
FIG. 3 is a diagram showing an arrangement of nozzles in a print head.

FIG. 3 shows an arrangement of the nozzles. On an ink ejecting surface of a print head 30 there are formed six nozzle columns 31 to 36 for ejecting six kinds of color inks respectively, the nozzle columns 31 to 36 being arranged side by side in a horizontal scanning direction. In each of the nozzle columns 31 to 36, plural nozzles (say, 48 nozzles) are arranged linearly at predetermined intervals in a vertical scanning direction.

The six ink cartridges 28a to 28f are filled with six different kinds of color inks respectively. In color printing, the ink cartridges K, C, M, Y, c, and m are loaded in the order of 28a to 28f. On the other hand, in monochromatic image printing, the ink cartridges K, k1, k2, Y, c, and m are loaded in the order of 28a to 28f. That is, the ink cartridges C and k1 can be loaded replaceably to the same cartridge holder 28, and the ink cartridges M and k2 can be loaded replaceably to the same cartridge holder 28.

Cartridge memories, which are non-volatile memories, are mounted on the ink cartridges 28a to 28f respectively to store the colors and residual amounts of loaded inks. When the ink cartridges are loaded to the cartridge holders 28, the cartridge memories are electrically connected to the control IC 25. The cartridge holders 28 are each provided with an ink supply needle, which comes into contact with an ink supply port (not shown) formed in each ink cartridge loaded to form an ink supply path. Through this ink supply path the color ink in the ink cartridge is fed to the print head 30 through the associated tube. In color printing, the color inks K, C, M, Y, c, and m are fed in the order of nozzle columns 31 to 36, while in monochromatic image printing the color inks K, k1, k2, Y, c, and m are fed in the order to nozzle columns 31 to 36.

The control IC 25 is an IC mounted for controlling the plural cartridge memories. The CPU 21 transmits and receives predetermined signals to and from the control IC 25, reads out information such as ink colors and residual amounts of inks stored in the cartridge memories, and updates information on residual amounts of inks. Further, the CPU 21 detects a loaded state of each of the ink cartridges 28a to 28f and outputs a signal indicative of removal or loading.

The communication I/O 26 is connected to the printer I/F 19 in the personal computer 10 and the printer 20 receives a printing job comprising data converted to K, C, M, Y, etc. and a page describing language, provided from the personal computer 10 through the communication I/O 26. Upon receipt of various requests from the personal computer 10, the communication I/O outputs color ink information indicative of colors and loaded states of inks provided from the control IC 25 to the personal computer 10.

A carriage mechanism 27a and a paper feed mechanism 27b are connected to the I/F 27. The paper feed mechanism 27b, which comprises a paper feed motor and a paper feed roller, functions to feed a printing/recording medium such as printing paper successively and performs a vertical scanning. The carriage mechanism 27a comprises a carriage for mounting the print head 30 thereon and a carriage motor for causing the carriage to travel through a timing belt or the like. The carriage mechanism 27a causes the print head 30 to perform a horizontal scanning. In the print head 30 provided with plural nozzles in the vertical scanning direction, piezoelectric elements are actuated on the basis of head data constituted by a bit string and in accordance with a drive signal outputted from the head driver 29, causing ink droplets to be ejected in dot unit from the nozzles.

In the personal computer 10, BIOS (basic input output system) is executed on the basis of the above hardware, and OS and APL are executed in an overlying layer. Basically, OS accesses the hardware through BIOS or directly, while APL transmits and receives data to and from the hardware through OS.

Various drivers for controlling the hardware are incorporated in OS and execute various controls as part of OS. The drivers include a display driver for controlling the CRT I/F 17 and a printer driver for controlling the printer I/F 19.

Figure 4:
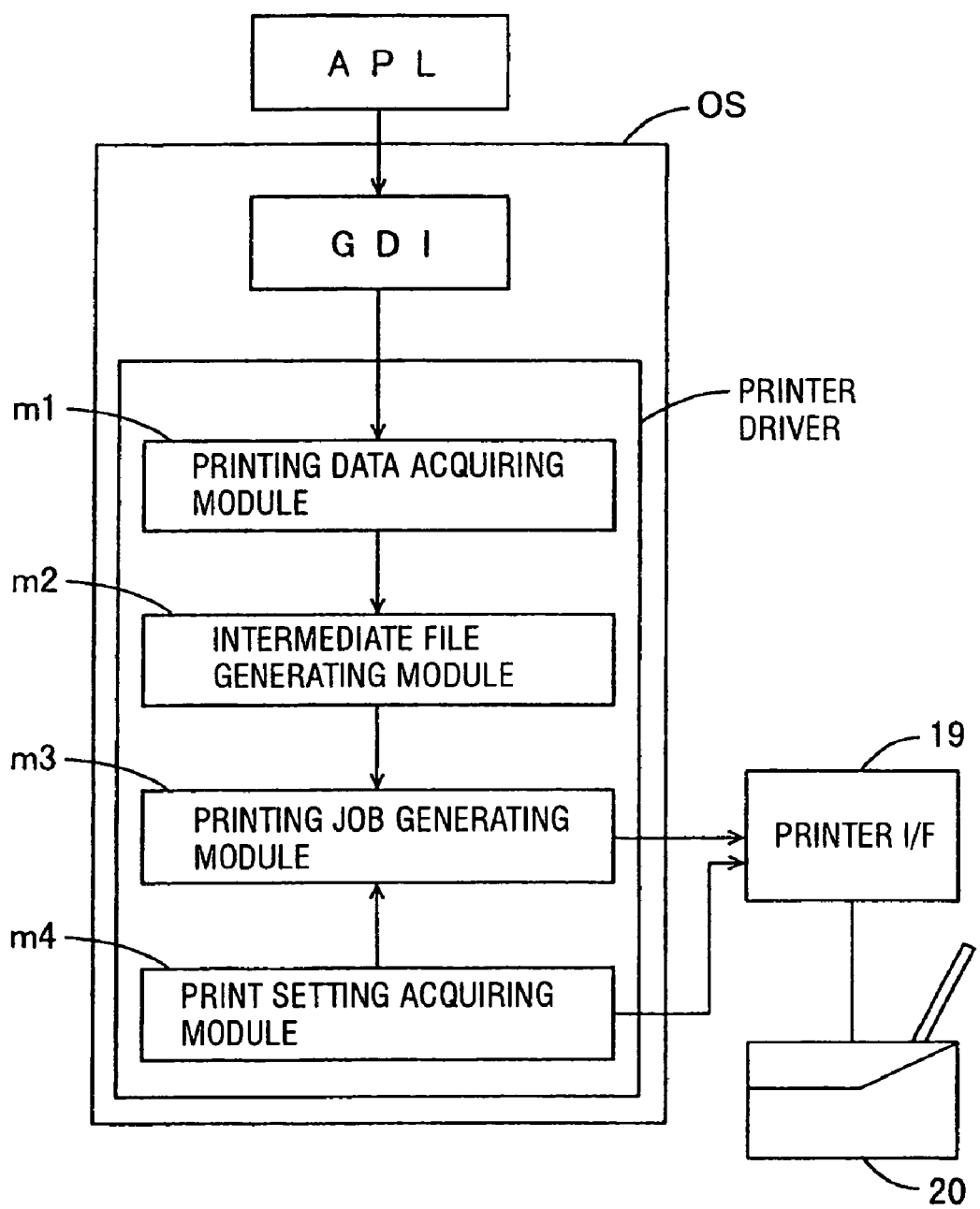
FIG. 4 is a block diagram showing an execution environment of a printer driver.

FIG. 4 illustrates a execution environment of the above printer driver in terms of a block diagram. The printer driver is operated at the time of executing the printing function of APL and can make two-way communications with the printer 20 through the printer I/F 19. The printer driver receives printing data from APL through OS, then prepares a printing job, and transmits the printing job to the printer 20. Further, the printer driver sends to the printer 20 a request for information indicative of ink colors and loaded states of ink cartridges and receives corresponding information from the printer 20, through the printer I/F 19.

In the OS are incorporated GDI (Graphics Device Interface) which implements a graphic user interface function between APL and OS with respect to graphics such as graphic image information and document information, and a port driver which stores printing data received from APL as an intermediate file to a predetermined area of the hard disc 14a and which generates a printing job by performing a predetermined processing for the intermediate file and transmits it to the printer 20.

The printer driver has a printing data acquiring module m1, an intermediate file generating module m2, a printing job generating module m3, and a print setting acquiring module m4, and can generate a printing job simultaneously with executing a predetermined function under control of a function control module (not shown).

The printing data acquiring module m1 acquires printing data generated by APL from GDI. The intermediate file generating module m2 generates an intermediate file from the printing data which the printing data acquiring module m1 has acquired, and then stores it in the hard disc 14a temporarily. The printing job generating module m3 acquires the intermediate file as necessary, executes an image processing for converting data based on RGB into color data based on K, C, M, Y, etc., generates a printing job, and outputs it to the printer 20 through the port driver. At this time, the printing job is generated on the basis of various printing parameters acquired by the print setting acquiring module m4.

(2) Changes of Data in Conversion From Printing Data to Printing Jobs

At the time of conversion from data based on RGB to the above color data there is used a color conversion table called LUT (look-up table). In this embodiment, in color printing, there is used LUT wherein data based on RGB are correlated with six kinds of color data K, C, M, Y, c, m, while in monochromatic image printing there is used LUT wherein data based on RGB are correlated with six kinds of color data K, k1, k2, Y, c, m.

Figure 5:
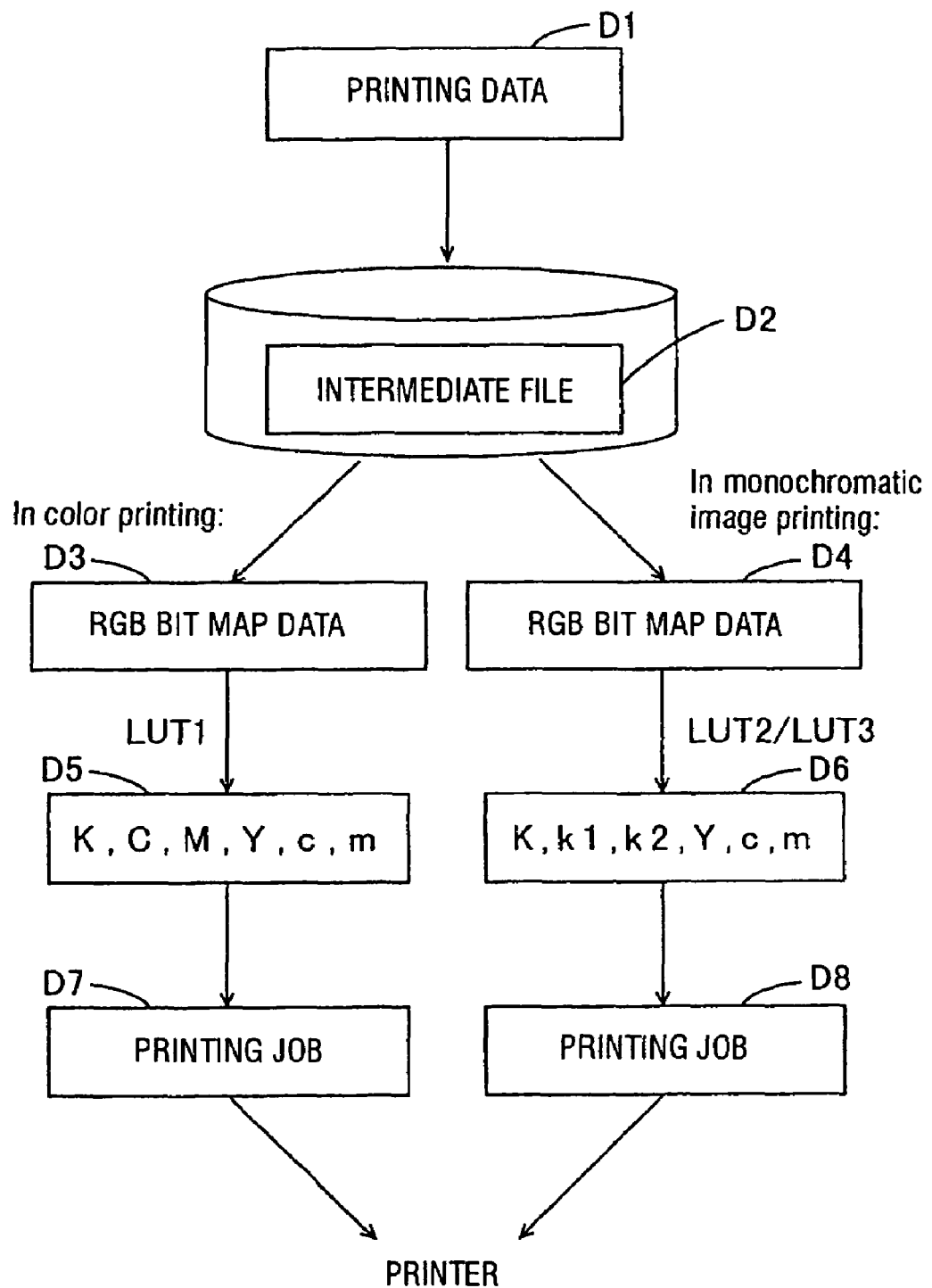
FIG. 5 is a diagram showing schematically changes of data which occur when printing data prepared by APL are converted to printing jobs.

FIG. 5 schematically shows changes of data in conversion from printing data prepared by APL to printing jobs.

Printing data D1 generated by APL is a printing command for generating a printing job in accordance with a predetermined rule. The printing data D1 is delivered to the printer driver through GDI by the printing data acquiring module m1 and is rewritten into an intermediate language by the intermediate file generating module m2, which language is stored as an intermediate file D2 into the hard disc 14a temporarily. The intermediate file D2 is read to RAM 13 and is converted to bit map data of 256 gray scales with eight bits allocated for each of RGB on the basis of the intermediate language contained in the interior, to give RGB bit map data D3 and D4. Of course, the gradation of RGB bit map data D3 and D4 is not limited to 256 gray scales, but various other values may be adopted.

The printer driver used in this embodiment has a function of imparting a hue to an achromatic image so as to give a desired tone in monochromatic image printing. In monochromatic image printing, therefore, the intermediate file D2 is once converted to achromatic bit map data, then a hue which is acquired by a setting process to be described later is imparted to the data and conversion is made into RGB bit map data D4.

Of course, printing data of a monochromatic image with such a hue as affords a desired tone imparted thereto may be prepared in APL. In this case, the printer driver is not required to have the function of imparting hue to the achromatic image, but can prepare RGB bit map data directly after preparing an intermediate file from printing data prepared by APL and can thereby prepare a printing job for monochromatic image printing.

In accordance with LUTs which correspond to the print type acquired by the print setting acquiring module m4, etc. the RGB bit map data D3 and D4 are converted respectively to color data D5 and D6 of 256 gray scales with eight bits allocated to each color ink. Also as to the gradation of the color data D5 and D6, various other values than 256 gray scales may be adopted. In the figure, LUT used in color printing is described as LUT1, while LUTs used in monochromatic image printing are described as LUT2 (priority given to high image quality) and LUT3 (priority given to running cost). LUT1 is a table wherein RGB bit map data are correlated with color data K, C, M, Y, c, m, while LUT2 and LUT3 are tables wherein RGB bit map data are correlated with color data K, C, M, Y, c, m. These tables LUT1 to LUT3 are determined according to color characteristics of the color inks.

The color data D5 and D6 are binarized by an error diffusion method and are converted to printing jobs D7 and D8 for output to the printer 20. Of course, the method for binarizing the color data D5 and D6 is not limited to the error diffusion method. There may be adopted another binarizing method such as the dither method. It is the modules m3 and m4 that causes the personal computer 10 to implement the processing of preparing the printing jobs D7 and D8 from the intermediate file D2.

Thus, the printer 20 can acquire the printing jobs D7, D8 and effect printing.

In this embodiment, an intermediate file is generated from printing data so that another program can be executed during the execution of printing by the printer 20, but RGB bit map data may be generated directly from printing data without providing the intermediate file preparing module.

Further, in monochromatic image printing, if monochromatic bit map data is the only printing data, the printing job generating module need not be provided with the function for conversion to monochromatic bit map data.

(3) Color-Reproducible Color Region in Monochromatic Image Printing

Figure 6:
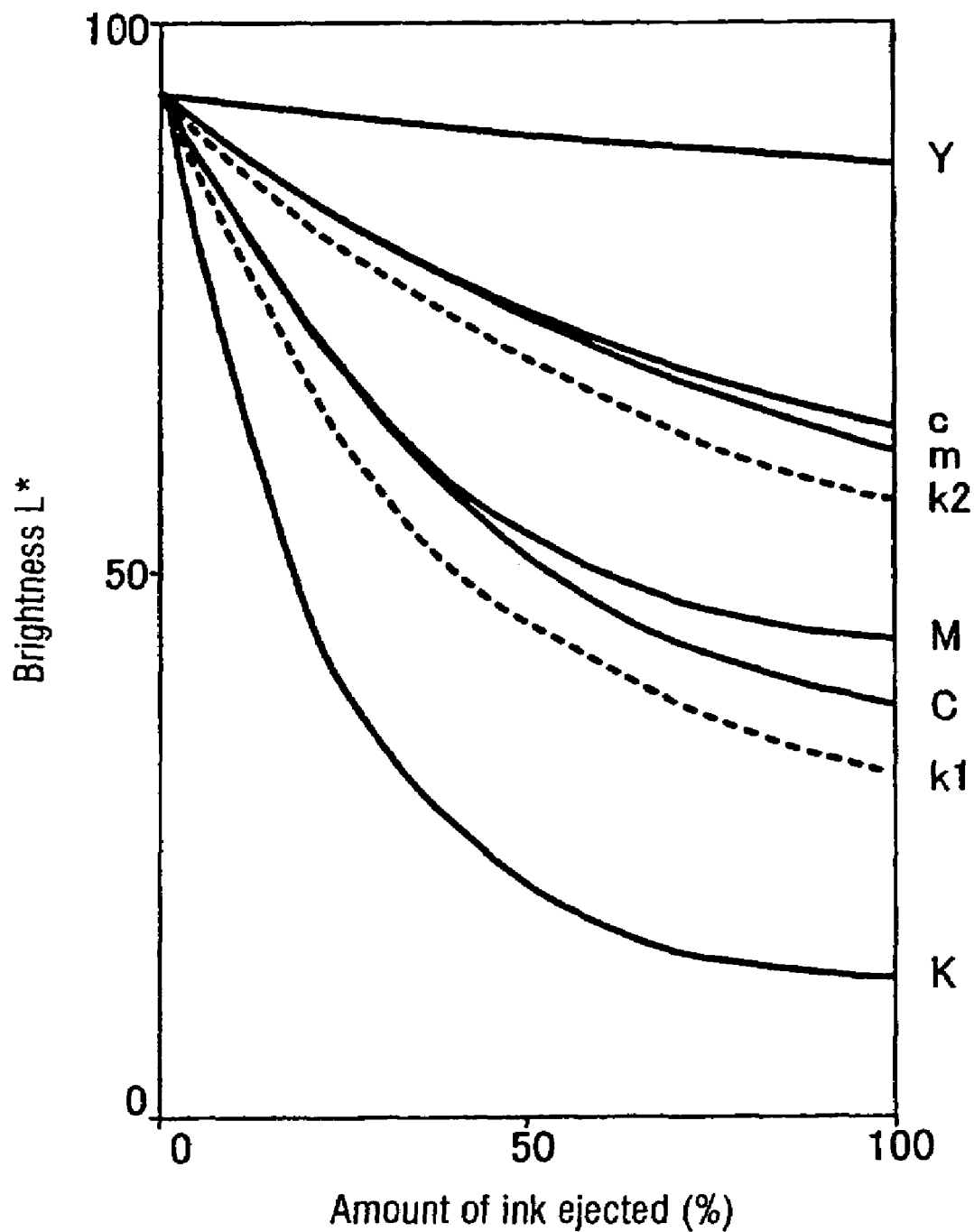
FIG. 6 is a diagram showing changes in brightness relative to ink implantation quantities which occur when color inks are ejected each individually.

FIG. 6 shows an example of changes in brightness relative to the amount of ink ejected per unit area when color inks are ejected each independently onto a white printing paper, in which the amount of ink ejected (unit: %) is plotted along the axis of abscissa and brightness L* is plotted along the axis of ordinate (L* is 0 to 100%, the larger, the brighter). The amount of ink ejected corresponds to the ratio of the number of dots ejected relative to the total number of dots per unit area on the printing paper, in other words, the density of dots relative to the printing paper. Brightness change curves differ depending on components even in the case of inks of the same color and also differ depending on the type of printing paper to be printed.

When the amount of ink ejected is 0%, that is, when no color ink is ejected, the brightness represents the brightness of the printing paper itself, but assumes a value somewhat smaller than 100%. When the color ink K is ejected 100%, that is, when it is ejected all dots per unit area relative to the printing paper, the brightness becomes the lowest, but assumes a value somewhat larger than 0%. The brightness L* of each color ink lowers according to the amount of ink ejected while describing a downwardly expanded curve.

As to the color inks C, M, and Y high in saturation, C and M exhibit similar changes in brightness and Y is higher in brightness than C and M. The color inks c and m low in saturation exhibit similar changes in brightness and their brightnesses lie between the brightnesses of C and M and the brightness of Y. The color ink k1 which is a light black color ink exhibits a change in brightness close to that of the color inks C and M. Likewise, the color ink k2 which is a light black color ink exhibits a change in brightness close to that of the color inks c and m. The densities of the color inks k1 and k2 may be set to various values. For example, the density of k2 may be set so as to exhibit a change in brightness close to that of C and M or close to that of Y.

Figure 7:
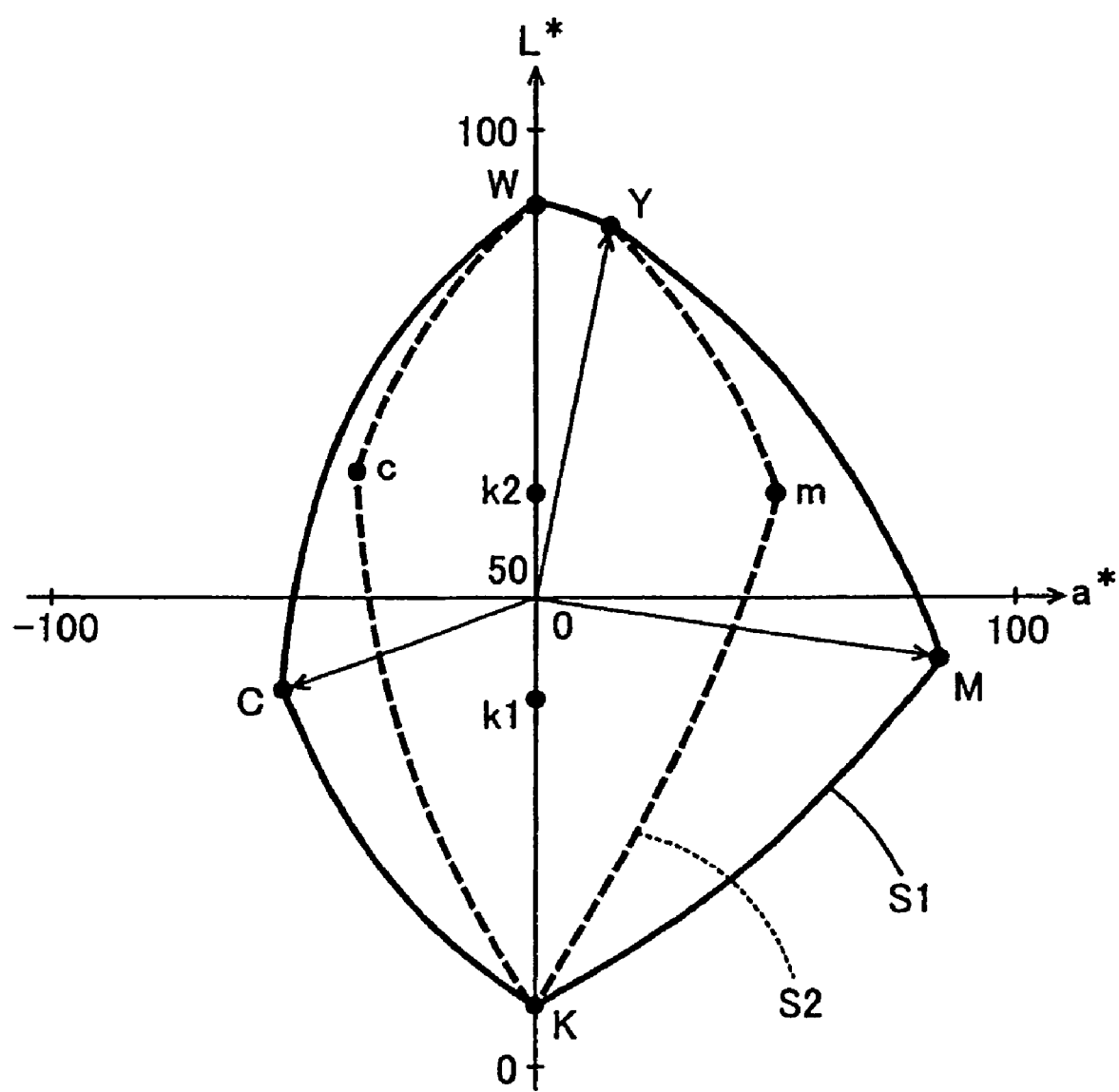
FIG. 7 is a diagram in which a color region capable of being color-reproduced by plural color inks is shown schematically by being projected on an a*L* plane in an L*a*b* space.
Figure 8:
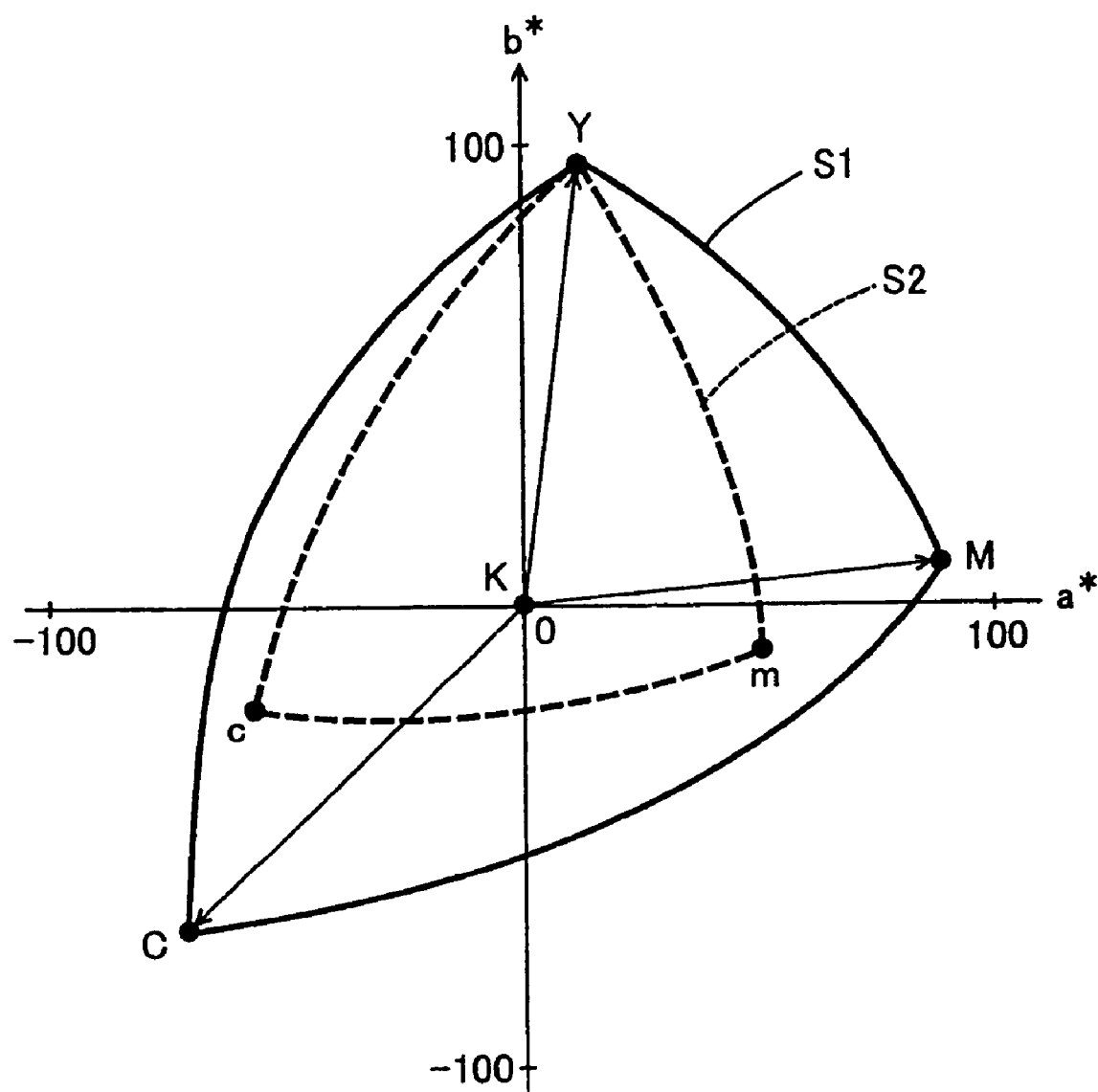
FIG. 8 is a diagram in which a color region capable of being color-reproduced by plural color inks is shown schematically by being projected on an a*b* plane in an L*a*b* space.

In FIG. 7, a color region (GAMUT) capable of being color-reproduced using plural color inks having the above properties is shown schematically in a projected state onto an a*L* plane in an L*a*b* space which is an absolute color space. FIG. 8 illustrates this color region schematically in a projected state onto an a*b* plane. L* provided on the vertical axis in FIG. 7 represents the above brightness, while a* and b* (unit: %) in FIGS. 7 and 8 represent hue and saturation. Saturation is represented in terms of a distance from the center (the position of K) in FIG. 8, while hue is represented in terms of a direction from the center in the same figure. The color region in color printing is indicated with a solid line, while the color region in monochromatic image printing is indicated with a dotted line. That the color region is represented by L*a*b* is a mere example and it may be represented by CIExy chromaticity diagram for example.

Although in this embodiment there are used cyan and magenta color inks C, M low in both saturation and density, it is not always necessary in practicing the invention that cyan and magenta color inks be low in density insofar as they are low in saturation. Even in case of printing a monochromatic image using such cyan and magenta color inks, the color region which is color-reproduced falls under such regions as indicated with dotted lines in FIGS. 7 and 8.

As to a* shown in the figures, the stronger the magenta, the larger the value thereof, and the stronger the green, the smaller the value thereof, while as to b*, the stronger the yellow, the larger the value thereof, and the stronger the blue, the smaller the value thereof. Therefore, among the chromatic color inks high in saturation, C represents coordinates which are minus in both a* and b*, M represents coordinates close to +100 in a* axis direction, and Y represents coordinates close to +100 in b* axis direction. The chromatic inks c and m low in saturation assume positions closer to L* axis rather than C and M. According to an actual measurement, the positions of c and m in FIG. 8 are deviated from straight lines connecting the center with the positions of C and M. The achromatic color ink K high in density represents coordinates close to 0 on L* axis. The achromatic color inks k1 and k2 low in density represent coordinates which become larger in L* in this order on L* axis.

In color printing, a color region S1 capable of being color-reproduced is a space surrounded with C, M, Y, K and coordinates W of the printing paper itself. Color-reproducible color regions substantially in cyan and magenta directions in color printing are indicated with solid line arrows in the figures. On the other hand, in printing a monochromatic image, since C and M are not used, a color-reproducible color region S2 corresponds to a space surrounded with c, m, Y, K and coordinates W of the printing paper itself. That is, in monochromatic image printing, solid line arrows in both C and M directions in the figures project from the color region S2 and thus the color-reproducible color region is narrowed substantially in cyan and magenta directions and is not narrowed substantially in the direction of yellow.

LUTs 2 and 3 for monochromatic image printing are tables in which RGB bit map data are correlated with color data of 256 gray scales with respect to each of K, k1, k2, Y, c, and m. That is, in the color-reproducible color region S2 which has been narrowed substantially in cyan and magenta directions there is made color reproduction using 256 gray scales. Since in color printing there is made color reproduction using 256 gray scales in the color-reproducible color region S1 which is not narrowed, color reproduction can be done in monochromatic image printing while enhancing the gradation characteristic substantially in cyan and magenta directions. In other words, resolution substantially in cyan and magenta directions is improved. That is, the color tone of a monochromatic image printed-can be adjusted minutely with respect to cyan and magenta color components.

Further, since the color ink Y high in saturation is used in monochromatic image printing, the color-reproducible color region S2 is wide substantially in the direction of yellow.

When looking at a monochromatic image, the human eye senses yellow component relatively small in comparison with cyan and magenta components. Therefore, even with use of the color ink Y high in saturation, it is possible to develop a color tone of a fine texture in appearance. On the other hand, as shown in FIG. 8, since the distance from the center up to Y is the same as in color printing, it is possible to ensure a sufficient selection range of saturation substantially in the direction of yellow. As a result, in comparison with the case of printing a monochromatic image with separate use of cyan, magenta and yellow color inks all low in saturation, it is possible to obtain a sufficient power of expression while developing a color tone of a fine texture in appearance. Moreover, since monochromatic image printing can be conducted using low-saturation color inks c and m which are used in a six-color printable printer, it is no longer required to separately provide special color inks.

In monochromatic image printing with sepia color imparted to neutral gray, a small amount of c and a large amount of Y can be used, so that sepia color can be expressed to a more satisfactory extent than before in comparison with the case of using a yellow color ink low in saturation.

Figure 9:
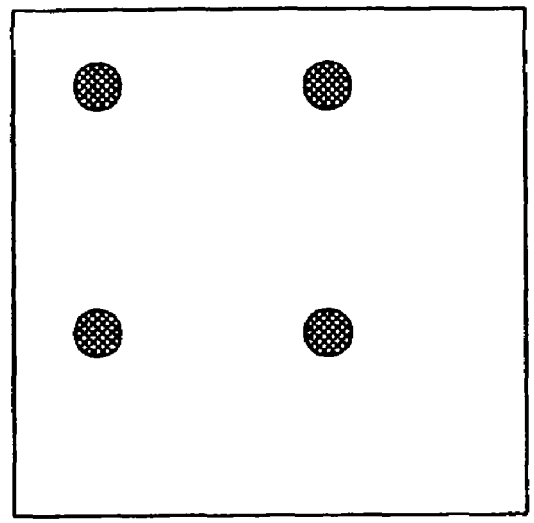
FIG. 9 is a schematic diagram in which dots formed are compared between the use of C and M high in both saturation and density and the use of c and m low in both saturation and density.
Figure 9:
Figure 9:
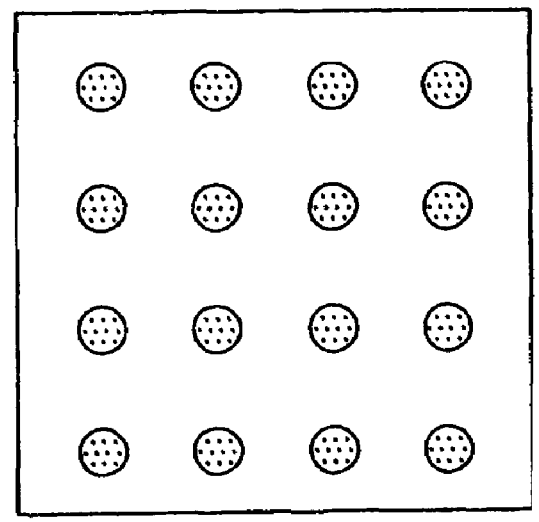

Further, since the color inks C and M high in both saturation and density are not used in monochromatic image printing, what is called color twist does not occur. FIG. 9 is a schematic diagram wherein dots formed on printing paper are compared between the use of C and M high in both saturation and density and the use of c and m low in both saturation and density. In monochromatic image printing, dots of c and m are mixed in dots of K, k1, and k2. The ratio between the number of dots in the use of C and M high in both saturation and density and the number of dots in the use of c and m low in both saturation and density may be changed according to properties of color inks and the ratios of dot number shown in the figure is merely one example.

In monochromatic image printing, the ratio of chromatic color inks to Black color inks is small in many cases. In there are used C and M high in both saturation and density, dots formed are very sparse, as shown in the upper portion of the figure. Consequently, an apparent hue does not become uniform, so that there may occur a case where an unintended hue called color twist appears. On the other hand, if there are used c and m low in both saturation and density, the density of dots formed increases, as shown in the lower portion of the figure. As a result, an apparent hue becomes uniform and there does not appear any unintended hue.

Figure 10:
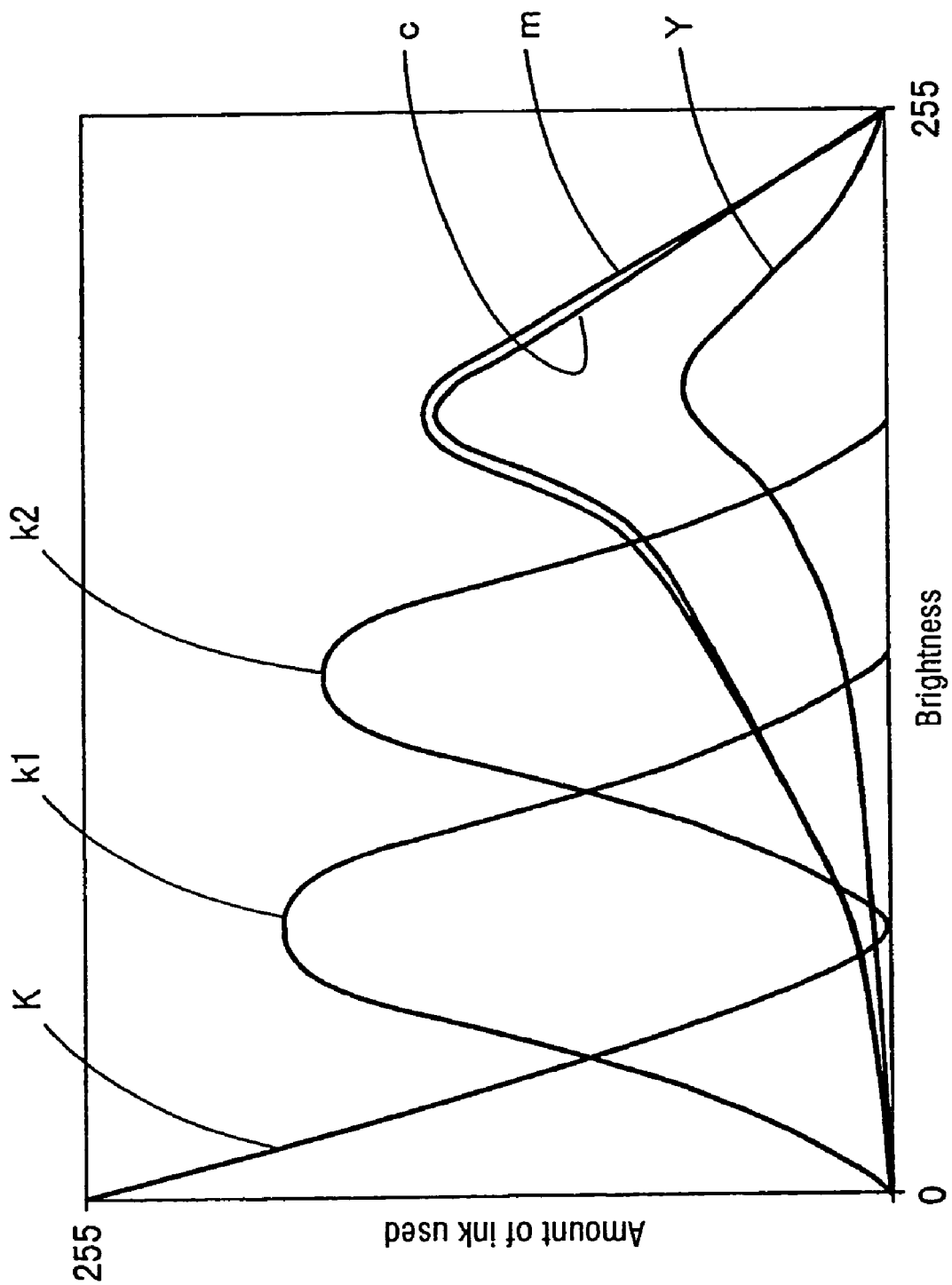
FIG. 10 is a diagram in which the amounts of color inks used relative to the brightness of a monochromatic image are shown in terms of gradation values.

In monochromatic image printing, three kinds of Black color inks K, k1, and k2 different in density are used and color reproduction is performed while selecting an appropriate Black color ink or inks according to the brightness of a monochromatic image. FIG. 10 shows the amounts of color inks K, k1, k2, Y, c, and m used in terms of gradation values relative to the brightness of the monochromatic image with saturation assumed to be zero (achromatic 256-gray scale bit map data).

Actually, in printing sepia color for example, a hue is created using the color inks c, m, and Y. In actual processing, RGB bit map data are converted to color data of K, k1, k2, Y, c, and m with use of such a LUT as affords the illustrated relation.

As shown in the figure, chromatic color inks c, m, Y are used in a high brightness portion, while Black color inks are used in a low brightness portion. Printing is performed using one or a combination of plural Black color inks. Since Black color inks comprise the color inks K, k1, and k2 different in density, it is possible to select an appropriate Black color ink according to the brightness of image. Further, by using light black color inks k1 and k2, it is possible to diminish the gap in brightness at the time of replacing various chromatic color inks with Black color inks.

Figure 11:
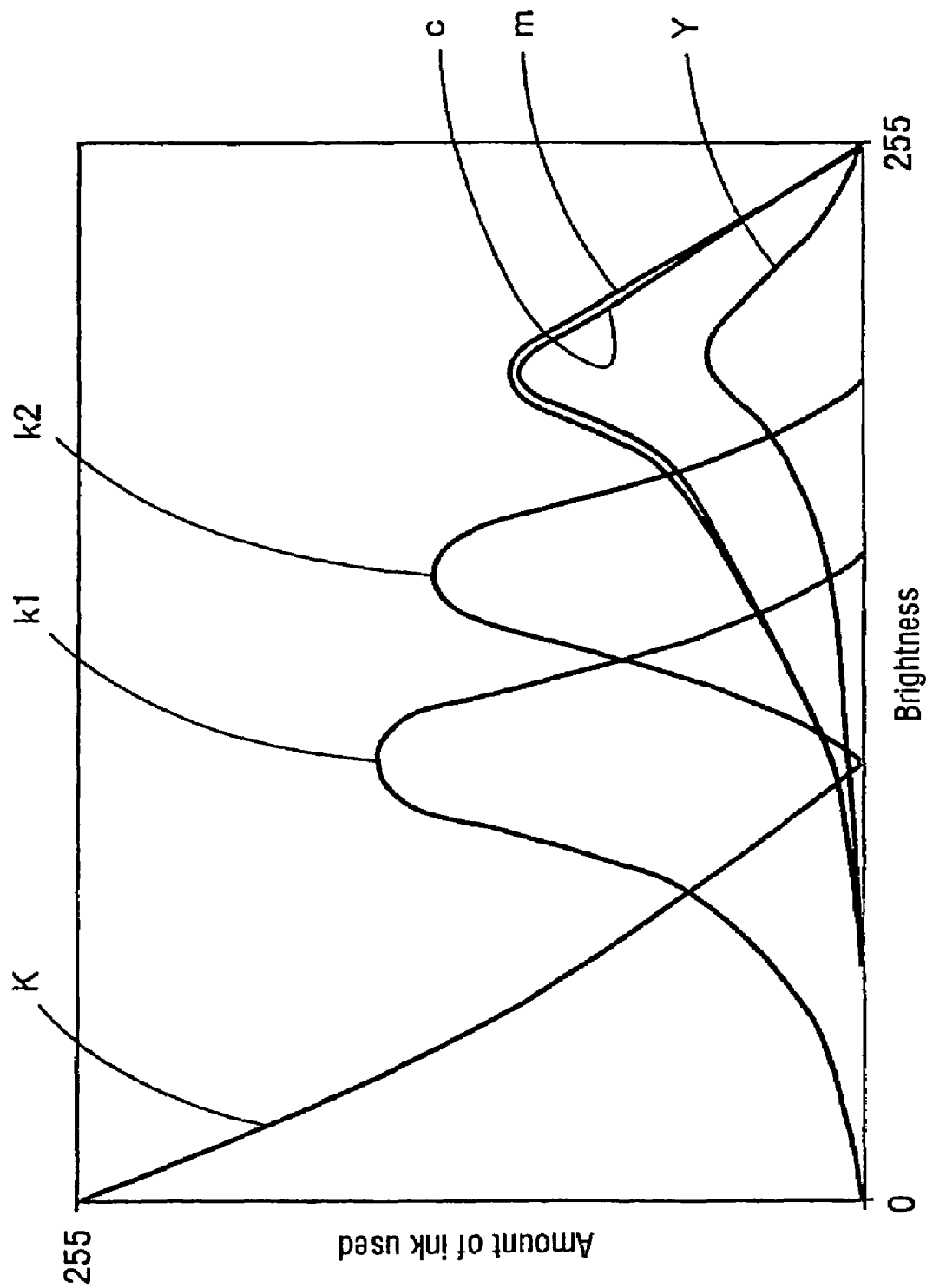
FIG. 11 is a diagram in which the amounts of color inks used relative to the brightness of a monochromatic image are shown in terms of gradation values.

The amounts of inks shown in FIG. 10 are based on the use of LUT2 with priority given to high image quality in monochromatic image printing. When using LUT3 with priority given to running cost, the curves which represent the amounts of color inks K, k1, and k2 used shift in a higher brightness direction, as shown in FIG. 11. As a result, the amounts of chromatic color inks c, m, and Y decrease. That is, by switching LUTs 2 and 3 from one to the other, it is possible to change the ratio between plural Black color inks and other color inks.

(4) Operation of the Printing System

The operation of the printing system 100 constructed as above will be described below with reference to an example of display screen.

Figure 12:
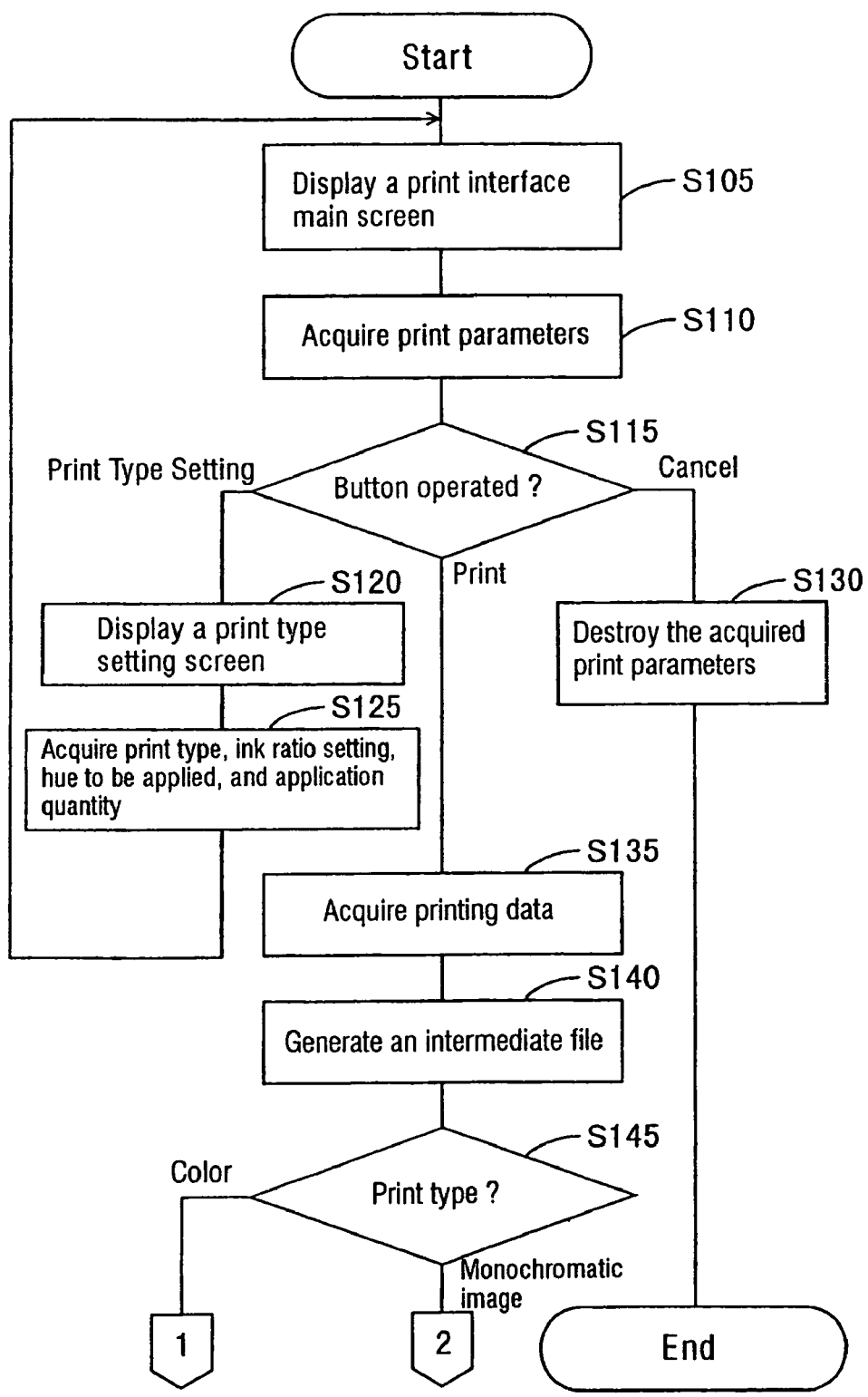
FIG. 12 is a flowchart showing an outline of processings executed by a personal computer.
Figure 13:
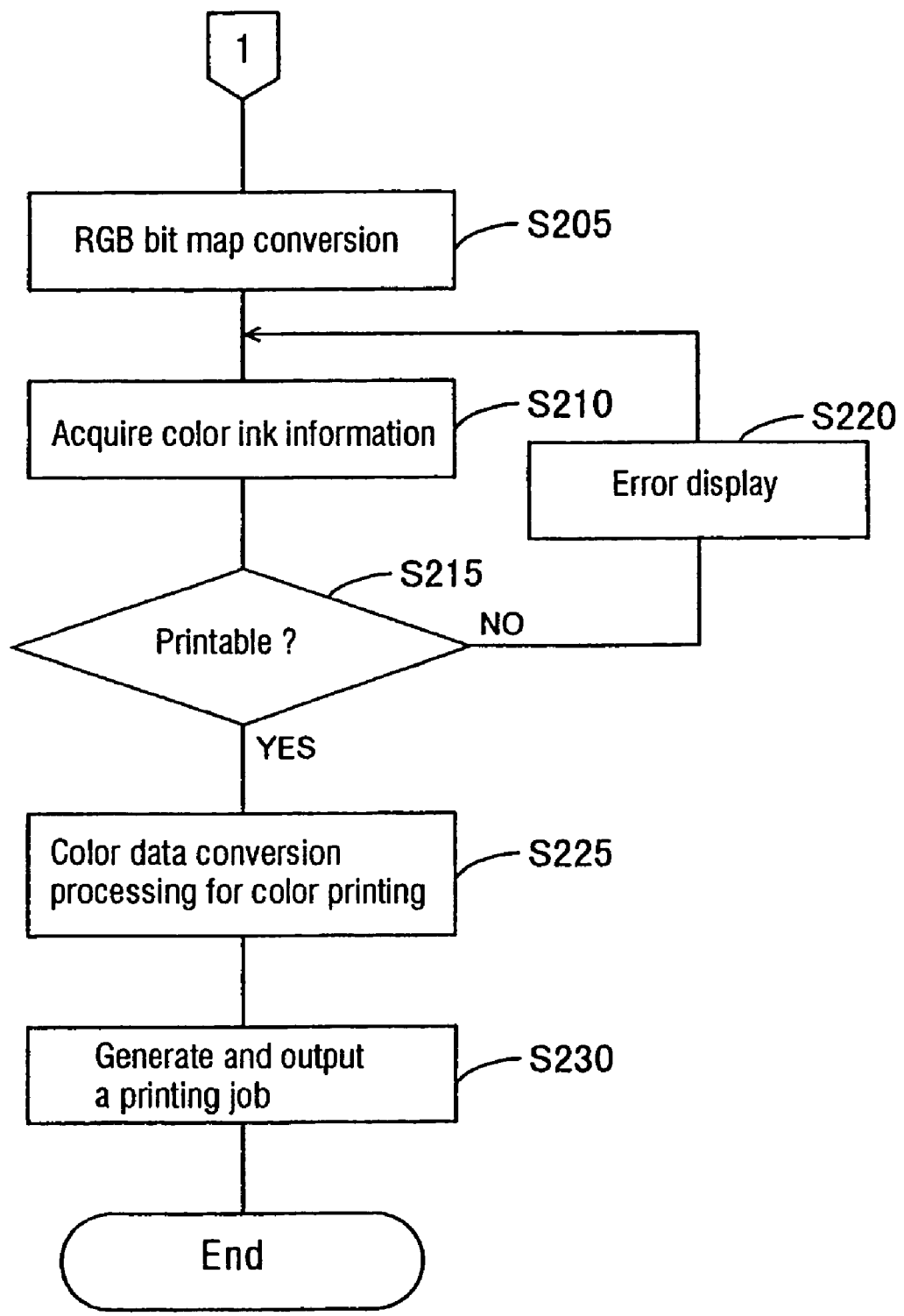
FIG. 13 is a flowchart showing an outline of processings executed by the personal computer.
Figure 14:
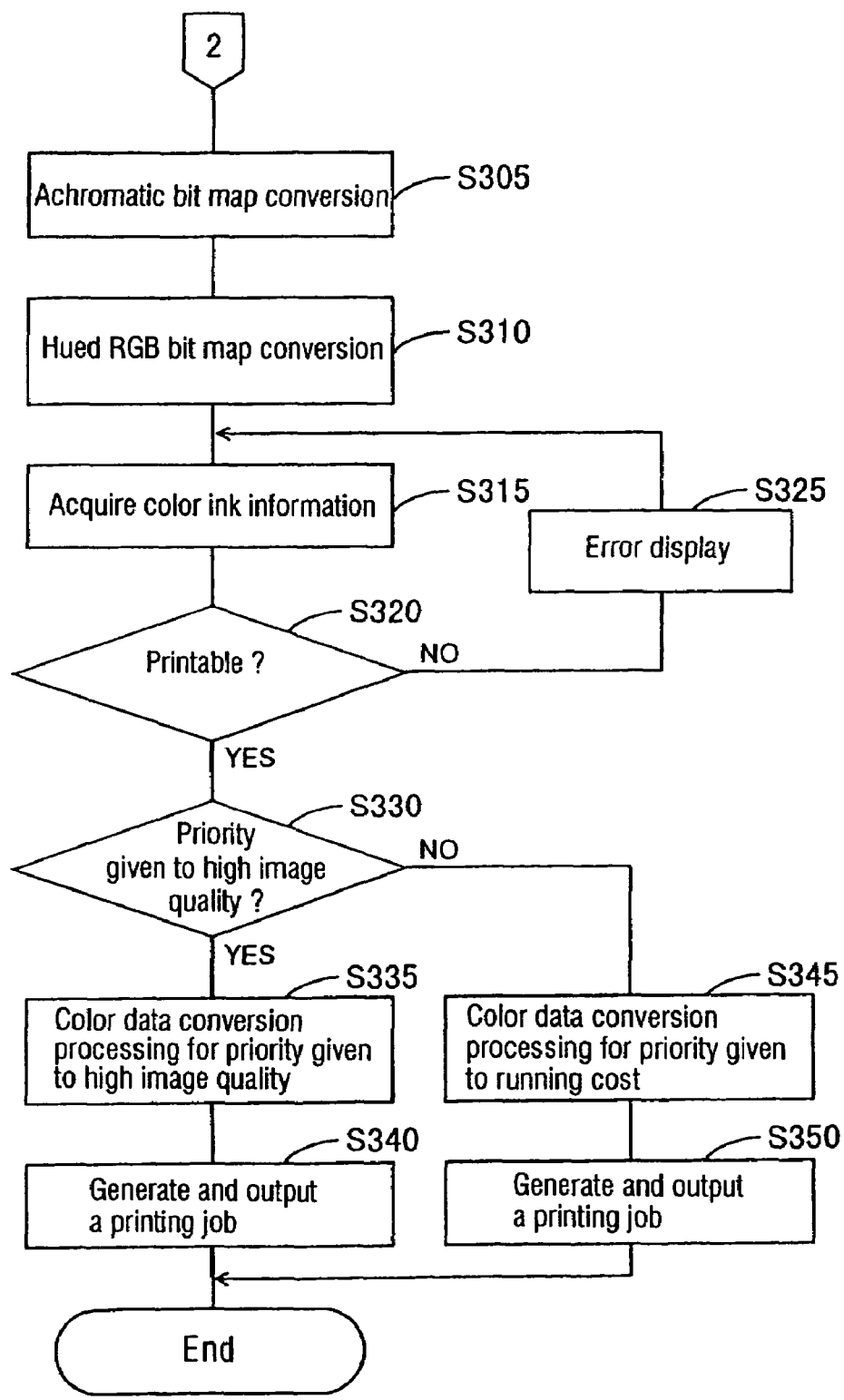
FIG. 14 is a flowchart showing an outline of processings executed by the personal computer.

FIGS. 12 to 14 are flowcharts showing an outline of processings performed by the personal computer 10 in the printing system 100. It is assumed that before execution of the illustrated processing flow, ink cartridges of C and M are loaded as ink cartridges 28b and 28c to cartridge holders 28 in color printing and ink cartridges of k1 and k2 are loaded as ink cartridges 28b and 28c in monochromatic image printing, both by a user.

APL has a printing function for APL. When a print execution menu to be displayed on the display 17a is selected by the printing function for APL, the printer driver causes the print setting acquiring module m4 to operate under control of the function control module and performs a processing for displaying a print interface main screen (not shown) (step S105). In the same screen there are displayed only such information pieces as can cope with ordinary print instructions, e.g., paper type selecting region, printing page range indicating region, print type setting button, print button, and cancel button. That is, with the mouse 16b for example, the user can select and input the type of printing paper in the paper type selecting region, and can set and input printing start page and end page in the printing page range indicating area. Various print parameters are acquired from operation inputs to those regions (step S110).

Next, the processing is branched according to a mouse operation to a button provided on the screen (step S115).

Figure 15:
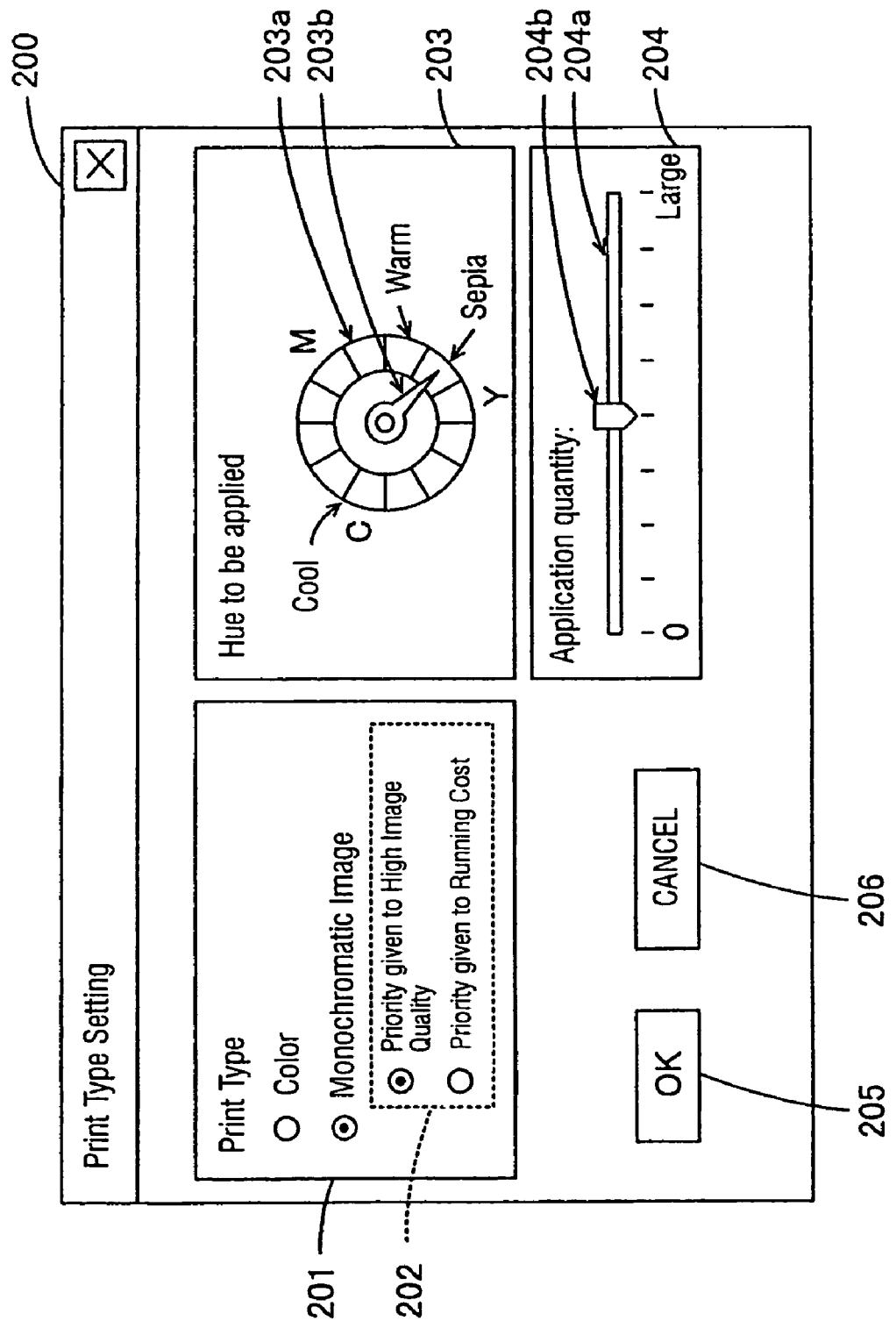
FIG. 15 is a diagram showing an example of a display on a print type setting screen.

If the print type setting button is clicked by the mouse 16b, the processing flow advances to step S120 and there is displayed a print type setting screen 200 shown in FIG. 15. On the left-hand side of the screen 200 are displayed a print type selecting field 201, OK button 205, and Cancel button 206. In the print type selecting field 201, only either "Color" or "Monochromatic Image" can be selected and inputted by the mouse 16b. Below the "Monochromatic Image" there is displayed an ink ratio selecting field 202, whereby when "Monochromatic Image" is selected and inputted, there can be selected and inputted only either "Priority given to High Image Quality" or "Priority given to Running Cost. When "Priority given to High Image Quality" is selected and inputted, the ratios of color inks are set so as to give such amounts of inks used as shown in FIG. 10, while when "Priority given to Running Cost" is selected, the ratios of color inks are set so as to give such amounts of inks used as shown in FIG. 11.

When "Monochromatic Image" is selected and inputted, a hue setting field 203 and an application quantity setting field 204 are displayed on the right-hand side of the print type setting screen 200. In the hue setting field 203 are displayed a hue ring 203a including cyan, magenta, and yellow (C, M, and Y, respectively, in the figure) and a needle 203b which can rotate with the center of the hue ring 203a as a rotational center. With the mouse 16b, the needle 203b can be positioned to a desired hue on the hue ring 203a. The positions of "Sepia", "Warm," and "Cool" are shown in the hue setting field 203, so that the needle 203b can be set to those positions easily.

In the application quantity setting field 204 are displayed a linear groove 204a and an arrow 204b which can slide along the groove 204a. When the arrow 204b is moved to the leftmost position by the mouse 16b, a black-and-white image with no hue applied thereto is set, while as the arrow 204b is moved rightwards, there is set a monochromatic image in such a manner that the hue set in the hue setting field 203 becomes stronger.

When an OK button 205 is clicked, the print type which has been selected and inputted in the print type selecting field 201 is obtained, and if "Monochromatic Image" is selected and inputted, there are obtained an ink ratio setting selected and inputted in the ink ratio selecting field 202, a hue corresponding to the position of the needle 203b in the hue setting field, and an application quantity corresponding to the position of the arrow 204b in the application quantity setting field (step S125). Then, the print type setting screen 200 is erased and the processing flow returns to step S105, in which the print interface main screen is again displayed. Though not shown in the processing flow, if a Cancel button 206 is clicked, the information inputted by operation is destroyed, the print type setting screen 200 is erased, and the processing flow returns to step S105.

That is, the processings of steps S120 to S125 not only constitute a print type acquiring means which acquires a print type of either monochromatic image printing or color printing, but also constitute a ratio setting acquiring means which acquires a ratio setting between plural Black color inks and other color inks.

If the cancel button on the print interface main screen is clicked at step S115, the processing flow advances to step S130, which cancels the thus obtained print parameters and end this processing flow.

If the Print button on the print interface main screen is clicked, the processing flow advances to step S135, in which the print data acquiring module m1 is operated to acquire print data D1 generated by APL through GDI. Next, the intermediate file generating module m2 is operated to generate an intermediate file on the basis of the acquired print data, which file is stored in the hard disc 14a temporarily (step S140).

Thereafter, the print job generating module m3 is operated, causing the processing flow to branch according to the set print type (step S145). If "Color" is selected and inputted in the print type selecting field 201, the processing flow advances to step S205 in FIG. 13, while if "monochromatic image" is selected and inputted in the print type selecting field 201, the processing flow advances to step S305 in FIG. 14.

In step S205, the intermediate file D2 is read and RGB bit map conversion is performed on the basis of the intermediate language included in the intermediate file D2 to generate RGB bit map data D3 on RAM 13.

In the printing system 100, as ink cartridges 28b and 28c in monochromatic image printing, ink cartridges of k1 and k2 are loaded instead of ink cartridges of C and M, so there may occur a case where ink cartridges of C and M are not loaded despite the processing being carried out is for color printing. To avoid this inconvenience, there is made a processing for acquiring from the printer 20 color ink information which includes such information pieces as ink colors and residual amounts in the loaded ink cartridges and for checking whether all of the color inks necessary for printing are employable or not.

In step S210, the above color ink information is acquired from the printer 20. More specifically, when a request for acquiring color ink information is outputted from the personal computer 10 to the printer 20 through the printer I/F 19, the printer 20 acquires this request, generates color ink information from information indicating ink color and residual amount in each of ink cartridges, and outputs the generated information to the personal computer 10 through communication I/O 26. In this way the personal computer 10 can acquire the color ink information outputted from the printer 20.

Next, on the basis of the color ink information there is made judgment as to whether color printing can be executed or not (step S215). That is, when all of the ink colors K, c, m, C, M, and Y are included in the color ink information and when the residual amounts of inks in all their ink cartridges are not zero, it is judged that printing can be done. Therefore, for example when ink cartridges of k1 and k2 are loaded as the ink cartridges 28b and 28c, it follows that C and M are not included as ink colors in the color ink information, so the conditions for printing are not satisfied.

If the conditions for printing are met in step S215, the processing flow advances to step S225, while if the answer is negative, the flow shifts to step S220. In step S220 there is made indication on an error display screen to the effect that printing cannot be done and that ink cartridges necessary for color printing should be loaded. Then, after the necessary ink cartridges have been loaded and OK button on the screen is clicked, there are again conducted the processings of steps S210 to S215. In step S220, this processing flow may be ended after display of the error display screen.

In step S225 there is performed a color data conversion processing for color printing. More specifically, RGB bit map data D3 is converted to color data D5 which comprises six kinds of K, C, M, Y, c, and m. This processing is carried out by converting 256-gray scale bit map data of each of R, G, B into 256-gray scale color data of each of K, C, M, Y, c, and m with reference to the foregoing LUT1 for color printing.

The color data D5 is binarized and a printing job D7 corresponding to K, C, M, Y, c, and m is generated and transmitted to the printer 20 (step S230) This processing flow is now ended. Then, the printer 20 acquires the printing job D7 and drives the print head 30 on the basis of the printing job D7 for form dots of color inks, thereby performing color printing.

When "Monochromatic Image" is selected and inputted in the print type selecting field 201, the processing flow advances from step S145 in FIG. 12 to step S305 in FIG. 14, in which the intermediate file D2 is read and is converted to achromatic bit map data on the basis of the intermediate language included in the intermediate file D2.

The printing data D1 acquired may be data of an image not containing information on hue or may be data for a color image. In the latter case, since gradation data on the colors R, G, and B are included, the processing to be carried out is to convert the gradation data into brightness data to afford achromatic bit map data. For example, if the gradation data on R, G, and B are represented by R, G, and B, respectively, brightness data L can roughly be calculated by the following arithmetic expression (1):

$$L = 0.30 \times R + 0.59 \times G + 0.11 \times B \quad (1)$$

Of course, the brightness data in question can be obtained by various other methods. For example, gradation data may be averaged or added to obtain brightness data. In the case where the printing data D1 includes such separated brightness data as data expressed in L*a*b* form, the processing for conversion to brightness data may be omitted.

Next, the achromatic bit map data is converted to RGB bit map data with hue not applied thereto and a hue is applied thereto on the basis of both hue and amount thereof to be applied which have been acquired from the hue setting field 203 and application quantity setting field 204, thereby making conversion into RGB bit map data D4 with hue applied thereto (step S310). The RGB bit map data D4 is generated on RAM 13. Components (R0, G0, B0) of R, G, B included in the RGB bit map data with hue not applied thereto can be obtained from the brightness data L in accordance with a predetermined conversion expression. Given that components of R, G, and B in the acquired hue to be applied are (r, g, b), a mean value of r, g, b is a, and the acquired application quantity is A0 ($0 \leq A0 \leq 1$), the components (R, G, B) of R, G, B in the hued RGB bit map data D4 can be calculated, for example, in accordance with the following arithmetic expressions (2) to (4):

$$R = R0 - a \times A0 + r \times A0 \quad (2)$$

$$G = G0 - a \times A0 + g \times A0 \quad (3)$$

$$B = B0 - a \times A0 + b \times A0 \qquad (4)$$

Of course, any other method than the use of the above expressions may be used for the conversion of achromatic bit map data into RGB bit map data.

Thereafter, the foregoing color ink information is acquired from the printer 20 (step S315). Next, from the color ink information it is judged whether it is possible to effect monochromatic image printing (step S320). More specifically, if all of K, k1, k2, C, M, and Y are included as ink colors in the color ink information and if all their residual amounts are not zero, there is made judgment that it is possible to effect printing. Therefore, if ink cartridges of C and M are loaded as ink cartridges 28ba and 28c, the conditions for printing are not satisfied.

If the answer is affirmative in step S320, the processing flow advances to step S330, while if the answer in step S320 is negative, the flow shifts to step S325. In step S325, the same error display screen as in step S220 is displayed. After the required ink cartridges are loaded and OK button provided on the screen is clicked, the processings of steps S315 to S320 are again performed.

In step S330, the processing flow is branched in accordance with the setting of ink ratio which has been set. If "Priority given to High Image Quality" is selected and inputted in the ink ratio selecting field 202, the processing flow advances to step S335, in which there is performed a color data conversion processing for priority given to high image quality in monochromatic image printing. To be more specific, there is conducted a processing for converting 256-gray scale bit map data on each of R, G, B into 256-gray scale color data D6 on each of K, k1, k2, Y, c, and m with reference to the foregoing LUT2. The LUT2 is a color conversion table for priority given to high image quality in monochromatic image printing. The values of color data of Y, c, m out of the data which constitute the color data D6 become larger than in the use of LUT3.

Thereafter, the color data D6 is binarized and a printing job DB corresponding to K, k1, k2, Y, c, and m is generated and transmitted to the printer 20 (step S340). Now this processing flow is ended. The printer 20 receives the printing job D8 and actuates the print head 30 on the basis of the printing job D8 to form dots of the color inks K, k1, k2, Y, c, m, thereby printing a monochromatic image.

On the other hand, if "Priority given to High Image Quality" is selected and inputted in the ink ratio selecting field 202, the processing flow advances from step S330 to step S345, in which there is performed a color data conversion processing for priority given to running cost in monochromatic image printing. More specifically, there is performed a processing for converting 256-gray scale bit map data on each of R, G, B into 256-gray scale color data D6 on each of K, k1, k2, Y, c, m with reference the foregoing LUT3. The LUT 3 is a color conversion table for priority given to running cost in monochromatic image printing. The values of color data of K, k1, k2 out of the data which constitute the color data D6 become larger than in the use of LUT2.

Subsequently, as in step S340, the color data D6 is binarized and a printing job D8 corresponding to K, k1, k2, Y, c, m is generated and transmitted to the printer 20 (step S350). Now this processing flow is ended. On this basis of the printing job D8 the printer 20 forms dots of the color inks K, k1, k2, Y, c, m and thereby print a monochromatic image.

Thus, with the personal computer 10 which carries out the processings in accordance with the flow of FIGS. 12 to 14 and the printer 20 connected thereto, color reproduction is effected under an enhanced gradation characteristic within a color-reproducible color region while the same color region is narrowed by c and m low in saturation, Y of a high saturation, and K, k1 and k2 which are Black color inks. In other words, in the printing system 100, Y of a high saturation is used together with K, k1 and k2 as achromatic inks and c and m low in saturation and monochromatic image printing is performed while the color region is not narrowed substantially in the direction of yellow from the time of color printing. As a result, it becomes possible to print a monochromatic image of a high image quality having a sufficient power of expression while ensuring a sufficient selection width of saturation.

Besides, the user can set which of monochromatic image printing and color printing is to be performed, and even if the number of loadable ink cartridges is limited, both monochromatic image printing and color printing can be done in the same printing system 100. Thus, the printing system 100 is convenient. Although the color inks k1 and k2 as light black color inks are provided so that they can be replaced with the color inks C and M high in saturation, it is possible to prevent such printing as is performed using unintended color inks, because printing is performed after making sure that the color inks to be used are required color inks.

Further, it is possible to set an ink ratio as to whether priority should be given to high image quality or to running cost in monochromatic image printing. Also in this point the printing system 100 is convenient.

In the above embodiment, means for inputting first, achromatic, multi-gradation image data is implemented in steps S135, S140, and S305. At this time, in step S305, a chromatic color image data is inputted, brightnesses of picture elements are determined on the basis of the inputted image data and are used as the above first image data.

Means for acquiring hue is implemented in steps S105 and S110. But in steps S105 and S110 there also is obtained an application quantity indicative of strength to be applied in addition of hue.

Further, means for converting the above first image data to the above second image data is implemented by steps S205 and S335 or S345. At this time, the above first image data is converted to third image data with hue applied to the first image data, followed by conversion to the above second image data. That is, the former conversion is a processing for changing the intensity of hue which is applied correspondingly to the application quantity acquired and is implemented by step S205.

Then, by utilizing a color conversion table, the third image data is subjected to color conversion to the second image data. This conversion is implemented by step S335 or S345. The color conversion table utilized at this time corresponds to the range of a color-reproducible color region which is determined by a saturation capable of being reproduced by the foregoing cyan color ink, a saturation capable of being reproduced by the foregoing magenta color ink, and a saturation capable of being reproduced by the foregoing yellow color ink. That is, a color space after the conversion by the color conversion table corresponds to the range of the color region referred to above. Although the above third image data has a hue, the number of color data capable of being obtained is within the range of the maximum gradation number of the first image data. Thus, on the basis of gradation value of the first image data it is possible to make conversion to the second image data of multi-gradation with the acquired hue applied thereto.

As to the color conversion table, plural Black color inks different in density are premised and plural such color conversion tables are provided so as to give different amounts of the Black color inks used. Such plural color conversion tables correspond respectively to conversion processings for priority given to high image quality and for priority given to running cost. Further, means for acquiring a selection result corresponding to changes in the amounts of the Black color inks used is implemented by steps S105 and S110. Moreover, the processing which selects any of the color conversion tables on the basis of the selection result and which causes color conversion to be effected using the selected color conversion table is implemented by step 330.

Further, means for converting the above second image data to the foregoing printing data of low gradation is implemented as a color data binarizing processing in steps S340 and S350.

(5) Modifications

The printing system according to the present invention may be implemented in various constructions.

For example, the printer may be integral with the computer, or may be a dedicated printer for printing only monochromatic images. It is not always necessary to have both color inks c and m. Having only one of the color inks c and m will do. Also in this case, monochromatic image printing can be done without narrowing the color region substantially in the direction of yellow from the time of color printing and it is possible to print a monochromatic image of a high image quality having a sufficient power of expression while ensuring a sufficient selection range of saturation. Moreover, the printer is not limited to the printer using piezoelectric elements for the ejection of color inks to form dots. For example, there may be used a bubble type printer wherein bubbles are generated within ink passages and color inks are ejected thereby. There also may be used a printer wherein the size of dots formed is variable, such as what is called a variable printer.

Further, plural color inks may be filled into a single ink cartridge. In the case where color printing and monochromatic image printing are performed while being switched from one to the other, there are provided, for example, an ink cartridge for color printing filled with all of the color inks K, C, M, Y, c, m and an ink cartridge for monochromatic image printing filled with all of the color inks K, k1, k2, Y, c, m and the two ink cartridges are replaced one with the other.

Providing ink cartridges replaceably is merely one example of construction. For example, there may be adopted a construction wherein all ink cartridges of K, k1, k2, C, M, Y, c, and m are loaded to the printer and, in color printing, color reproduction is performed using the color inks K, C, M, Y, c, and m, while in monochromatic image printing, color reproduction is performed using the color inks K, k1, k2, Y, c, and m. Of course, the color inks k1 or k2 may be provided replaceably with only the color ink C or with only the color ink M. In case of using five kinds of colors K, k1, Y, c, and m without using the color ink k2 in monochromatic image printing, the color ink k1 may be provided replaceably with the color ink C or M.

Further, as to the processing flow shown in FIGS. 12 to 14, the execution of the processings is not limited to within the personal computer, but a part or the whole thereof may be executed by the printer or using a dedicated image processor.

In the above embodiment the printer driver applies a hue to an achromatic image so as to give a desired tone in monochromatic image printing, but for generating printing data on a monochromatic image with hue applied thereto by APL, the foregoing steps S305 to S310 may be substituted by a processing which involves making RGB bitmap conversion directly from an intermediate file to generate RGB bit map data. Also in this case, by step S315 and subsequent processings, if color reproduction is performed under an enhanced gradation characteristic in a color-reproducible color region while narrowing the same color region using c and m low in saturation, Y of a high saturation, and K, k1, and k2 which are Black color inks, it is possible to print a monochromatic image of a high quality having a sufficient power of expression while ensuring a sufficient selection range of saturation.

The processing to be performed in case of applying a hue so as to give a desired hue is not limited to the processing wherein there is made conversion to such color data as K, Y, c, and m after generation of RGB bit map data with the hue applied thereto. There may be conducted a processing such that the color data of Y, c, and m are corrected for the application of hue after conversion from unhued, achromatic bit map data to such color data as K, Y, c, and m.

Further, at the time of generating color data for priority given to high image quality and color data for priority given to running cost in monochromatic image printing, the processing for generating the color data is not limited to the processing that uses different LUTs. The color data may be generated by an arithmetic processing for conversion from one color data to the other color data. For example, in case of converting the color data for priority given to high image quality to the color data for priority given to running cost, there may be conducted an arithmetic processing which converts a portion of the color data Y, c, and m into color data of an achromatic color ink such as k2.

For example, this arithmetic processing can be done in the following manner. First, C and M color data conversion values are calculated from the color data of c and m and minimum values MIN of the color data of C, M, and Y are determined. Next, given that gradation values of k2, Y, c, and m are k2, Y, c, and m, respectively, gradation values of k2, Y, c, and m after conversion are k2', Y', c', and m', respectively, and correction coefficients are A1 to A4, the gradation data after conversion can be obtained in accordance with the following arithmetic expressions (5) to (8):

$$k2'=k2+A1\times MIN \qquad (5)$$

$$Y'=Y-A2\times MIN \qquad (6)$$

$$c'=c-A3\times MIN \qquad (7)$$

$$m'=m-A4\times MIN \qquad (8)$$

The correction coefficients A1 to A4 may be determined according to densities of the color inks k2, Y, c, and m.

Thus, the conversion to color data for priority given to running cost can be done without using the LUT for that priority.

According to the present invention, as set forth above, it is possible to provide a printing system which, in any of various modes, can print a monochromatic image of a high image quality having a sufficient power of expression while ensuring a sufficient selection range of saturation. The printing system is also applicable as a printing method and program for the system, as well as a medium which stores the program.

The foregoing invention has been described in terms of preferred embodiments. However, those skilled in the art will recognize that many variations of such embodiments exist. Such variations are intended to be within the scope of the present invention and the appended claims.

I claim:

1. A color ink set for monochromatic image printing, said color ink set comprising:

a plurality of black inks each different in brightness based on a difference in brightness of separate sheets of white printing paper onto which 100% of one of each of the black color inks are ejected independently;

a plurality of cyan color inks each different in brightness based on a difference in brightness of separate sheets of white printing paper onto which 100% of one each of the cyan color inks are ejected independently;

a plurality of magenta color inks each different in brightness based on a difference in brightness of separate sheets of white printing paper onto which 100% of one of each of the magenta color inks are ejected independently;

a yellow color ink;

wherein, a brightness of a white printing paper onto which 100% of the yellow color ink is ejected is higher than the brightness of a white printing paper onto which a cyan color of a highest brightness is ejected; and the brightness of the white printing paper onto which 100% of the yellow color ink is ejected is higher than the brightness of a white printing paper onto which a magenta color of a highest brightness is ejected.

* * * * *